United States Patent
Lee et al.

(10) Patent No.: US 10,402,021 B2
(45) Date of Patent: Sep. 3, 2019

(54) TOUCH SENSING DEVICE AND METHOD OF MANUFACTURING THE SAME

(71) Applicant: Samsung Display Co., Ltd., Yongin-si (KR)

(72) Inventors: Choon-Hyop Lee, Suwon-si (KR); Young-Sik Kim, Cheonan-si (KR); In-Nam Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 142 days.

(21) Appl. No.: 15/357,720

(22) Filed: Nov. 21, 2016

(65) Prior Publication Data

US 2017/0160870 A1 Jun. 8, 2017

(30) Foreign Application Priority Data

Dec. 3, 2015 (KR) .................. 10-2015-0171112

(51) Int. Cl.
*G06F 3/041* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC .................. G06F 3/041; G06F 3/044
See application file for complete search history.

(56) References Cited

U.S. PATENT DOCUMENTS

| | | | |
|---|---|---|---|
| 7,920,129 B2 | 4/2011 | Hotelling et al. | |
| 2010/0045614 A1* | 2/2010 | Gray | G06F 3/044 345/173 |
| 2014/0001024 A1* | 1/2014 | Liao | G06F 3/044 200/600 |
| 2014/0078068 A1* | 3/2014 | Jones | G06F 3/044 345/173 |
| 2014/0098304 A1* | 4/2014 | Kim | G06F 3/044 349/12 |
| 2014/0210749 A1* | 7/2014 | Park | G06F 3/044 345/173 |
| 2014/0211109 A1* | 7/2014 | Wu | G06F 3/041 349/12 |

(Continued)

*Primary Examiner* — Chanh D Nguyen
*Assistant Examiner* — Nguyen H Truong
(74) *Attorney, Agent, or Firm* — H.C. Park & Associates, PLC

(57) ABSTRACT

A touch sensing device may include a base substrate, and a first touch electrode including first sensing patterns disposed on the base substrate wherein each first sensing pattern has a shape that is periodically repeated along a first direction, a first dummy pattern disposed between the first sensing patterns on the same layer, and a first dummy connector connecting each first sensing pattern to the first dummy pattern. A first insulation layer is disposed on the first touch electrode, and a second touch electrode including second sensing patterns disposed on the first insulation layer wherein each second sensing pattern has a shape that is periodically repeated along a second direction crossing the first direction, a second dummy pattern disposed between the plurality of second sensing patterns on the same layer, and a second dummy connector connecting each second sensing pattern to the second dummy pattern.

18 Claims, 24 Drawing Sheets

(56) References Cited

U.S. PATENT DOCUMENTS

2016/0246393 A1* 8/2016 Lee .................. G06F 3/044
2016/0370942 A1* 12/2016 Sakashita ............ G06F 3/044
2017/0045979 A1* 2/2017 Li ..................... G06F 3/044
2017/0139502 A1* 5/2017 Ootani ............... G06F 3/044

* cited by examiner

TOUCH SENSING DEVICE AND METHOD OF MANUFACTURING THE SAME

CROSS-REFERENCE TO RLATED APPLICATION

This application claims priority from and the benefit of Korean Patent Application No. 10-2015-0171112, filed on Dec. 3, 2015, which is hereby incorporated by reference for all purposes as if fully set forth herein.

BACKGROUND

Field

Exemplary embodiments relate to touch sensing devices and methods of manufacturing the touch sensing devices. More particularly, exemplary embodiments relate to touch sensing devices with reduced defects and methods of manufacturing such touch sensing devices.

Discussion of the Background

Research has accelerated on display devices such as liquid crystal display (LCD) devices, plasma display panel (PDP) devices, field emission display (FED) devices, electrophoretic display (EPD) devices, organic light emitting display (OLED) devices, etc.

Recently, display devices may include touch sensing functions. A touch sensing device is an input device through which a user may touch a screen with equipment such as a finger or a pen to input instructions. The touch sensing device may replace conventional input devices such as a keyboard or a mouse, so that the scope of usage of the touch sensing device is gradually expanding.

The touch sensing device may be implemented by a resistive method, a light sensing method, a capacitive method, or the like. The touch sensing device with the capacitive method may sense capacitive changes formed between a conductive sensing pattern and another sensing pattern (or a ground electrode), and may translate a contact location to an electric signal.

A touch electrode of the touch sensing device may include sensing patterns for sensing touches and a connector for connecting the sensing patterns. The connector may connect the sensing patterns and may be formed with a narrow width. Therefore, an electrical resistance of the connector may be relatively high. Accordingly, electrostatic charges on the connector may induce a short circuit, thereby causing defects on the touch sensing device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch sensing device with reduced defects.

Exemplary embodiments provide a method of manufacturing the touch sensing device.

Additional aspects will be set forth in the detailed description which follows, and, in part, will be apparent from the disclosure, or may be learned by practice of the inventive concept.

According to an exemplary embodiment, a touch sensing device may include a base substrate, and a first touch electrode including first sensing patterns disposed on the base substrate wherein each first sensing pattern has a shape that is periodically repeated along a first direction, a first dummy pattern disposed on a same layer as the first sensing patterns and disposed between the first sensing patterns, and a first dummy connector connecting each first sensing pattern to the first dummy pattern. The touch sensing device may also include a first insulation layer disposed on the first touch electrode, and a second touch electrode including second sensing patterns disposed on the first insulation layer wherein each second sensing pattern has a shape that is periodically repeated along a second direction crossing the first direction, a second dummy pattern disposed on a same layer as the second sensing patterns and disposed between the plurality of second sensing patterns, and a second dummy connector connecting each second sensing pattern to the second dummy pattern.

According to another exemplary embodiment, in a method of manufacturing a touch sensing device, a first touch electrode may be formed on a base substrate. The first touch electrode may include a plurality first sensing patterns having a shape that is periodically repeated along a first direction, a first dummy pattern disposed on a same layer as the plurality of first sensing patterns and between the plurality of first sensing patterns, and a first dummy connector connecting the plurality of first sensing patterns to the first dummy pattern. A first insulation layer may be formed on the first touch electrode. A second touch electrode may be formed on the first insulation layer. The second touch electrode may include a plurality of second sensing patterns having a shape that is periodically repeated along a second direction crossing the first direction, a second dummy pattern disposed on a same layer as the plurality of second sensing patterns and between the plurality of second sensing patterns, and a second dummy connector connecting the plurality of second sensing patterns to the second dummy pattern.

According to an exemplary embodiment, the dummy pattern of the touch sensing device may be electrically connected to the sensing connector through the dummy connector. Therefore, electrostatic charges may be distributed to the dummy pattern. Accordingly, the sensing connector may have a relatively low electrical resistance, and defects on the touch sensing device may be reduced.

Additionally, the dummy pattern of the touch sensing device may be electrically connected to the sensing electrodes which are connected by the sensing connector at two points on the sensing electrodes which are spaced apart from the sensing connector in predetermined distances through the dummy connector. Accordingly, even though the sensing connector is damaged, a signal may bypass through the dummy pattern. Therefore, defects on the touch sensing device may be reduced.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF ILLUSTRATED THE EMBODIMENTS

Figure 1:
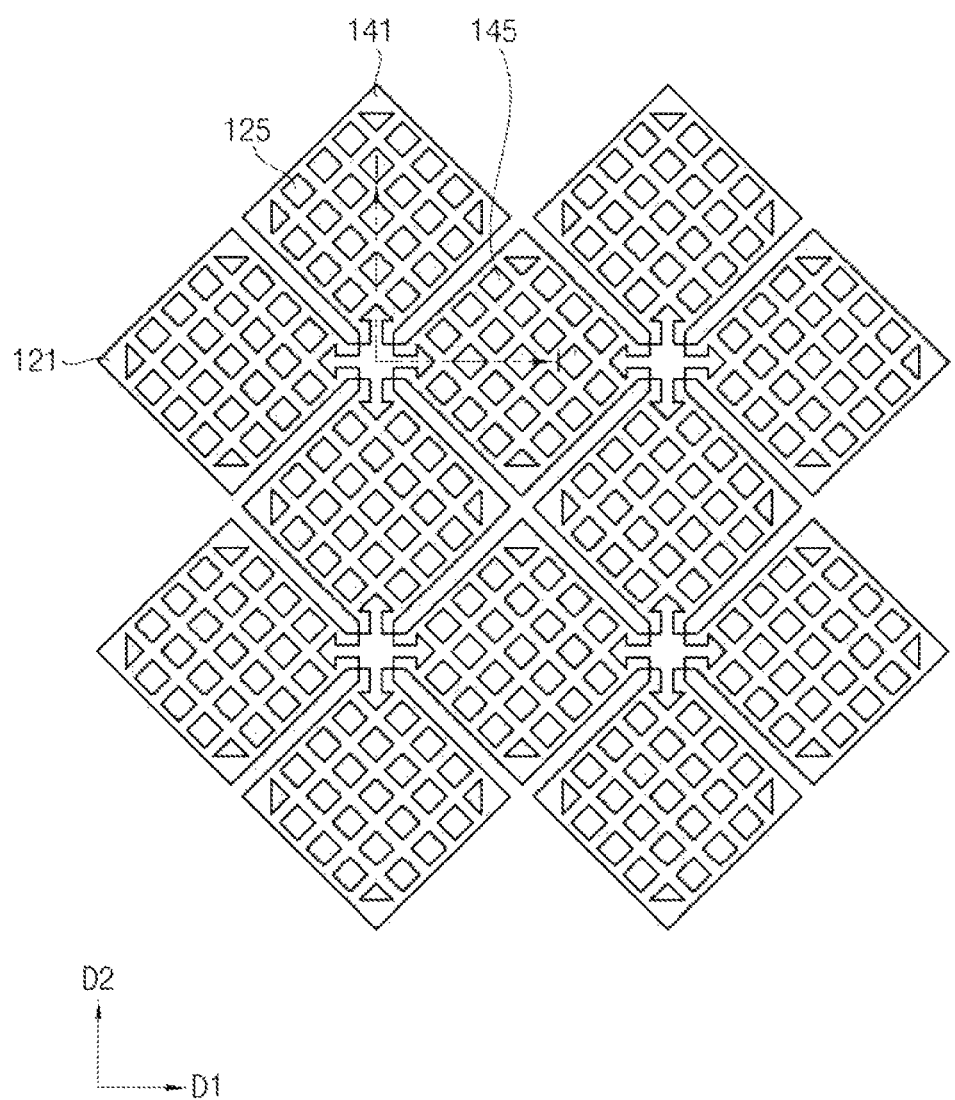
FIG. 1 is a plan view illustrating a touch sensing device in accordance with an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
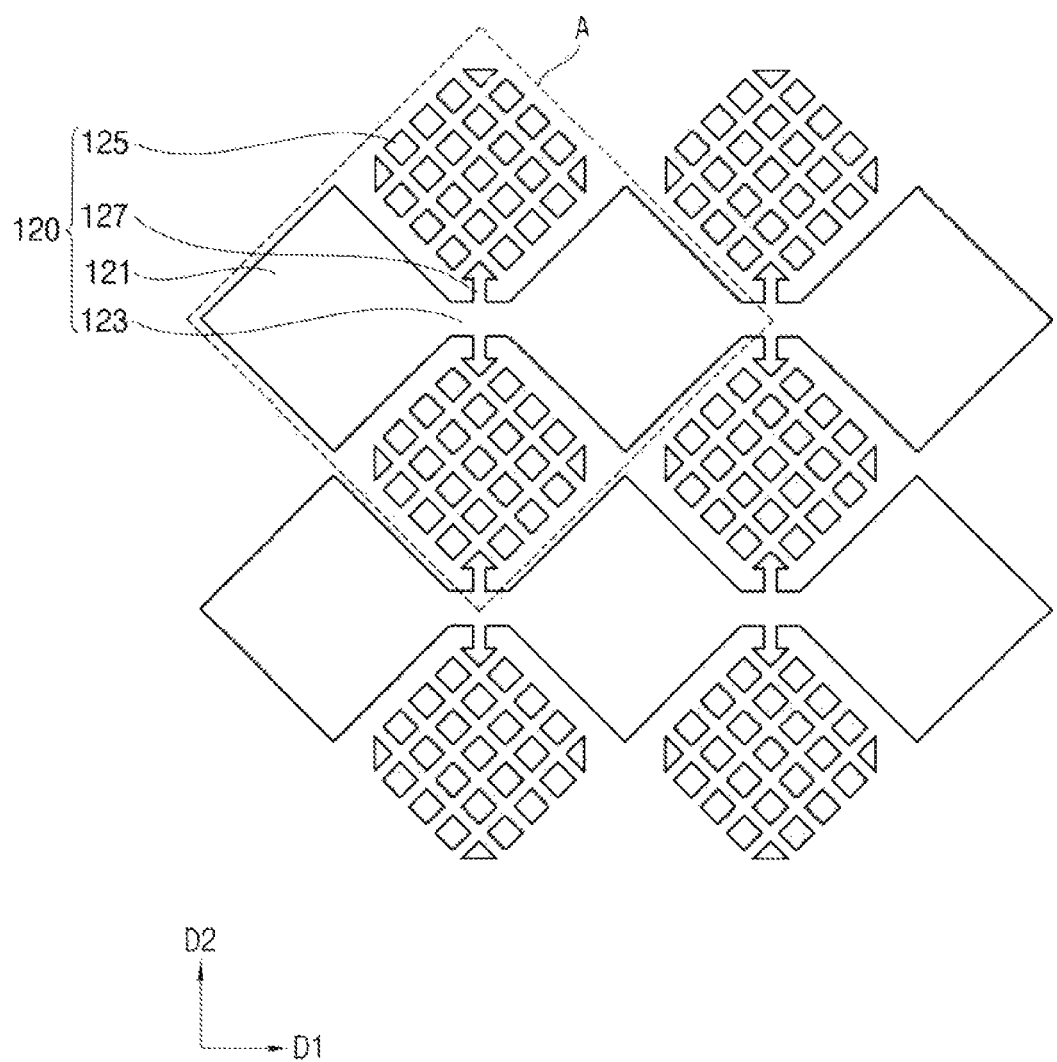
FIG. 2 is a plan view illustrating a first touch electrode in FIG. 1.
Figure 3:
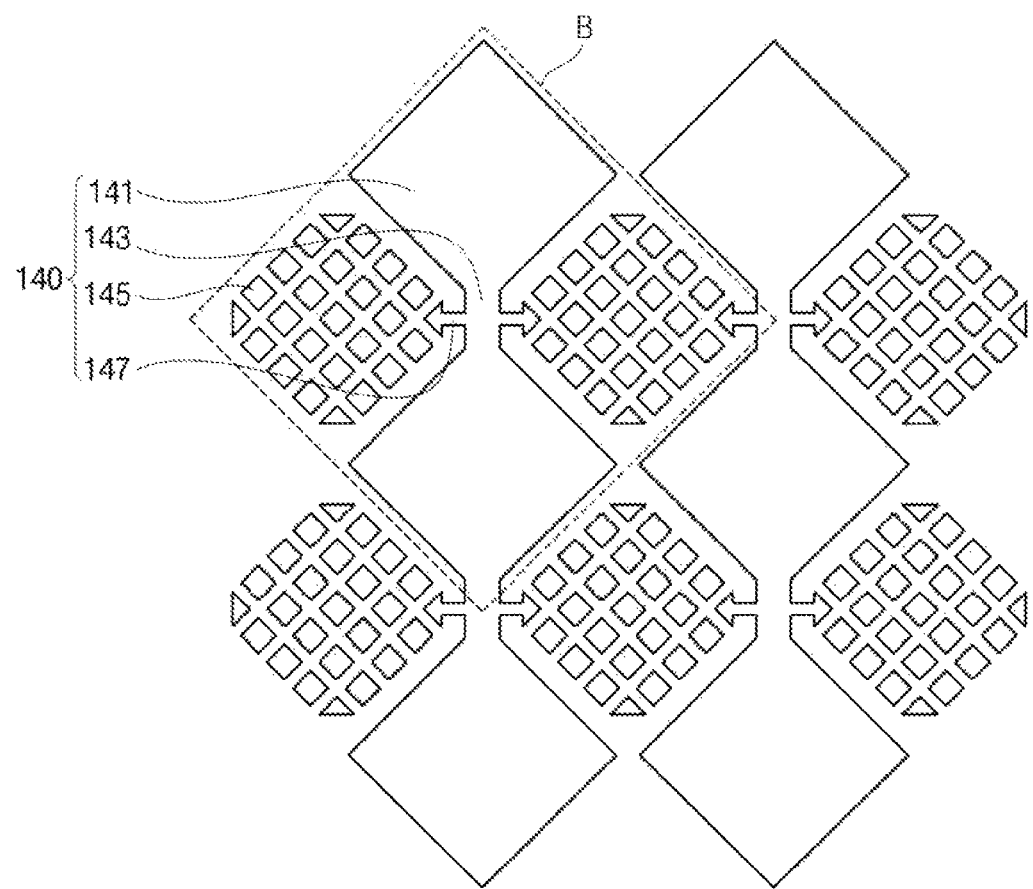
FIG. 3 is a plan view illustrating a second touch electrode in FIG. 1.
Figure 4:
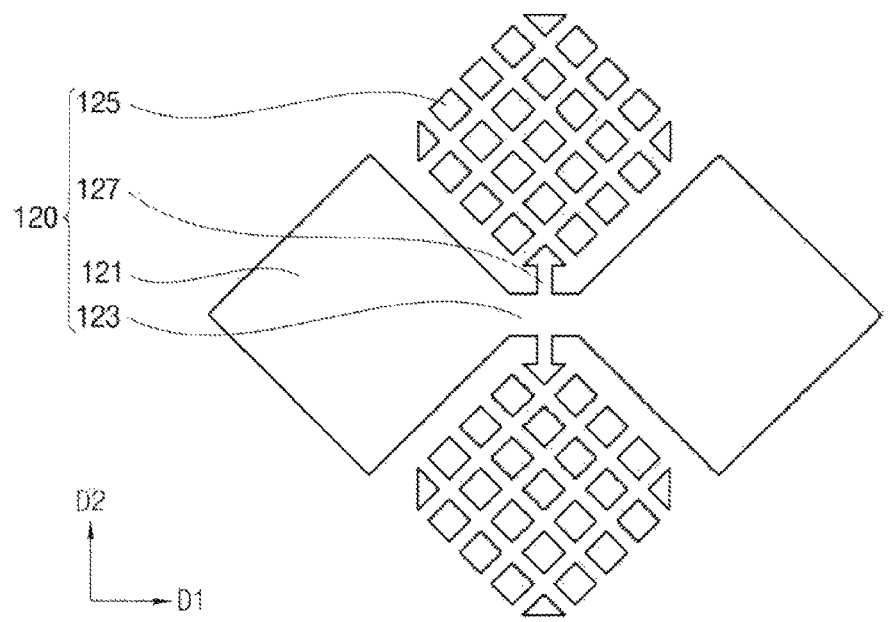
FIG. 4 is a plan view enlarging an area A in FIG. 2.
Figure 5:
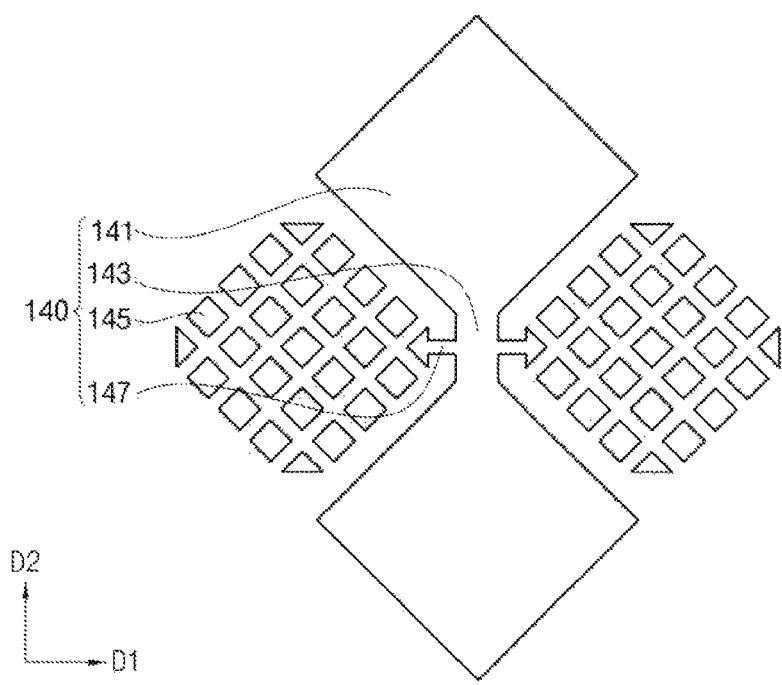
FIG. 5 is a plan view enlarging an area B in FIG. 3.
Figure 6:
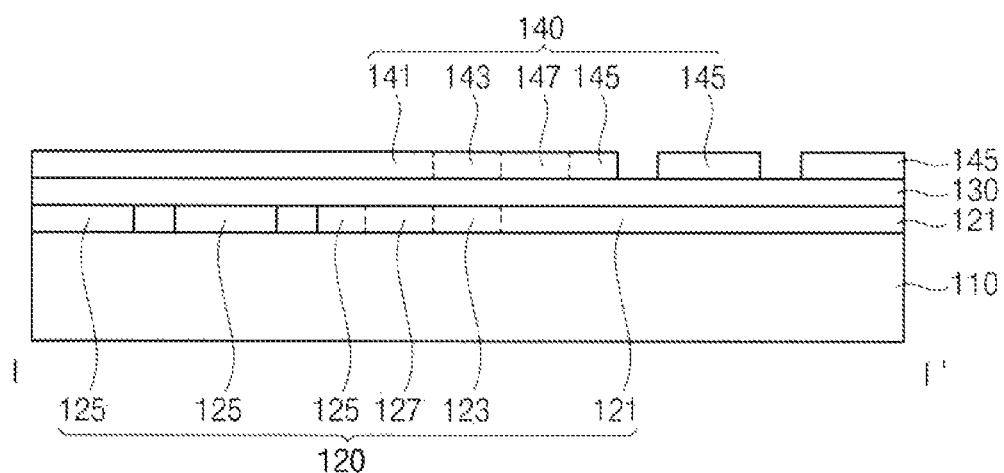
FIG. 6 is a cross-sectional view cut along a line I-I' in FIG. 1.

FIG. 1 is a plan view illustrating a touch sensing device in accordance with an exemplary embodiment. FIG. 2 is a plan view illustrating a first touch electrode in FIG. 1. FIG. 3 is a plan view illustrating a second touch electrode in FIG. 1. FIG. 4 is a plan view enlarging an area A in FIG. 2. FIG. 5 is a plan view enlarging an area B in FIG. 3. FIG. 6 is a cross-sectional view cut along a line I-I' in FIG. 1.

Referring to FIGS. 1, 2, 3, 4, 5, and 6, a touch sensing device in accordance with an exemplary embodiment may include a base substrate 110, a first touch electrode 120, a first insulation layer 130, and a second touch electrode 140.

The base substrate 110 may include a transparent material. For example, the base substrate 110 may include quartz, synthetic quartz, calcium fluoride, fluorine doped quartz, soda lime glass, non-alkali glass, or the like.

Alternatively, the base substrate 110 may include a flexible and transparent resin substrate. For example, a polyimide substrate may be an example of the transparent resin substrate which can be used as the base substrate 110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 110 may have a structure in which the first polyimide layer, the barrier film layer, and the second polyimide layer are layered on a glass substrate.

The first touch electrode 120 may be disposed on the base substrate 110. The first touch electrode 120 may include a first sensing pattern, a first dummy pattern 125, and a first dummy connector 127. The first sensing pattern may include a plurality of first sensing electrodes 121 and a first sensing connector 123.

Each of the first sensing electrodes 121 may be formed in a diamond shape. The first sensing connector 123 may electrically connect the first sensing electrodes 121. The first sensing electrodes 121 may be connected by the first sensing connector 123 thereby extending along a first direction D1. The first sensing electrodes 121 may be formed in substantially the same layer as the first sensing connector 123.

The first dummy pattern 125 may include a plurality of first sub-dummy patterns which are spaced apart from each other. In an exemplary embodiment, each of the first sub-dummy patterns may be formed in a diamond shape, and an area of the first sub-dummy pattern may be less than that of the first sensing electrode 121. The first dummy pattern 125 may be formed at substantially the same layer as the first sensing electrodes 121.

The first sensing connector 123 may be electrically connected to one of the first sub-dummy patterns which is adjacent to the first sensing connector 123 by the first dummy connector 127. However, the present disclosure is not limited thereto, and the first sensing connector 123 may be connected to another first sub-dummy pattern.

A width of the first sensing connector 123 may be less than that of the first sensing electrode 121. Therefore, an electrical resistance of the first sensing connector 123 may be greater than that of the first sensing electrode 121. Accordingly, the first sensing connector 123 may be damaged by electrostatic phenomenon or the like. Additionally, defects on the touch sensing device may be increased by the damage of the first sensing connector 123.

However, the first sensing connector 123, according to an exemplary embodiment, may be electrically connected to the first dummy pattern 125 by the first dummy connector 127. Accordingly, electrostatic charges may be distributed to the first dummy pattern 125. Therefore, the first sensing connector 123 may have a relatively low electrical resistance, and defects on the touch sensing device may be reduced.

The first touch electrode 120 may include silver nanowire. However, the present disclosure is not limited thereto. The first touch electrode 120 may include a transparent conductive material. For example, the first touch electrode 120 may include indium zinc oxide (IZO) and/or indium tin oxide (ITO).

The first insulation layer 130 may be disposed on the first touch electrode 120. The first insulation layer 130 may be a photosensitive film. When the first insulation layer 130 is formed as the photosensitive film, the photosensitive film may be used during the formation of the second touch electrode 140, and may serve as an insulation layer insulating the first touch electrode 120 and the second touch electrode 140.

The photosensitive film may replace a conventional insulation layer, so that a thickness of the touch sensing device may be decreased.

However, the present disclosure is not limited thereto. The first insulation layer 130 may include inorganic insulation material. For example, the first insulation layer 130 may include silicon oxide ($SiO_x$) and/or silicon nitride ($SiN_x$). For example, the first insulation layer 130 may have a multi-layered structure including different materials.

The second touch electrode 140 may be disposed on the first insulation layer 130. The second touch electrode 140 may include a second sensing pattern, a second dummy pattern 145, and a second dummy connector 147. The second sensing pattern may include a plurality of second sensing electrodes 141 and a second sensing connector 143.

Each of the second sensing electrodes 141 may be formed in a diamond shape. The second sensing connector 143 may electrically connect the second sensing electrodes 141. The second sensing electrodes 141 may be connected by the second sensing connector 143 thereby extending along a second direction D2 crossing the first direction D1. The second sensing electrodes 141 may be formed at substantially the same layer as the second sensing connector 143.

The second dummy pattern 145 may include a plurality of second sub-dummy patterns which are spaced apart from each other. In an exemplary embodiment, each of the second sub-dummy patterns may be formed in a diamond shape, and an area of the second sub-dummy pattern may be less than that of the second sensing electrode 141. The second dummy pattern 145 may be formed at substantially the same layer as the second sensing electrodes 141.

The second sensing connector 143 may be electrically connected to one of the second sub-dummy patterns, which is adjacent to the second sensing connector 143, by the second dummy connector 147. However, the present disclosure is not limited thereto, and the second sensing connector 143 may be connected to another second sub-dummy pattern.

A width of the second sensing connector 143 may be less than that of the second sensing electrode 141. Therefore, an electrical resistance of the second sensing connector 143 may be greater than that of the second sensing electrode 141. Accordingly, the second sensing connector 143 may be damaged by electrostatic phenomenon or the like. Additionally, defects on the touch sensing device may be increased by the damage of the second sensing connector 143.

However, the second sensing connector 143, according to an exemplary embodiment, may be electrically connected to the second dummy pattern 145 by the second dummy connector 147. Accordingly, electrostatic charges may be distributed to the second dummy pattern 145. Therefore, the second sensing connector 143 may have a relatively low electrical resistance, and defects on the touch sensing device may be reduced.

The second touch electrode 140 may include silver nanowire. However, the present disclosure is not limited thereto. The second touch electrode 140 may include a transparent conductive material. For example, the second touch electrode 140 may include indium zinc oxide (IZO) and/or indium tin oxide (ITO).

Figure 7:
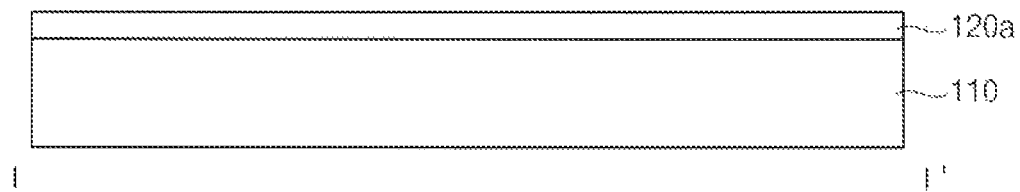
FIGS. 7, 8, and 9 are cross-sectional views illustrating a method of manufacturing a touch sensing device in FIG. 6.
Figure 8:
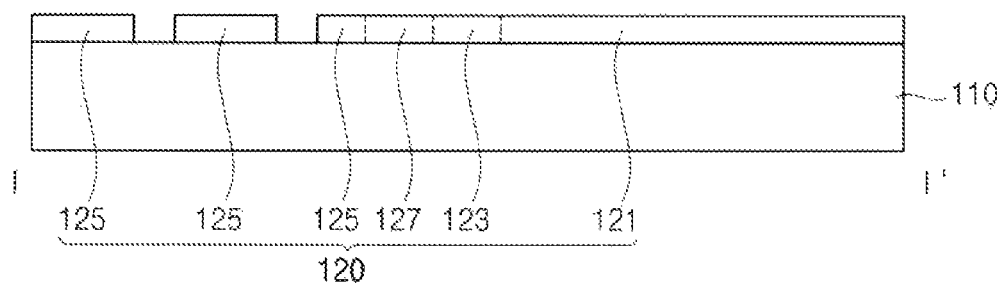
Figure 9:
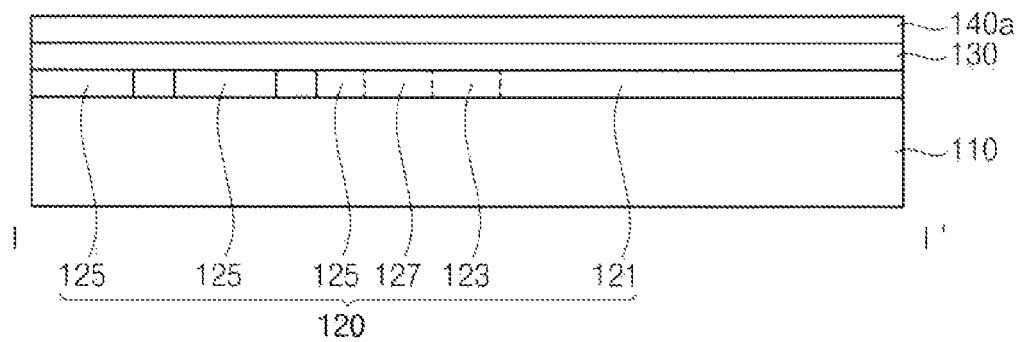

FIGS. 7, 8, and 9 are cross-sectional views illustrating a method of manufacturing a touch sensing device in FIG. 6.

Referring to FIG. 7, a first touch electrode layer 120a may be formed on a base substrate 110.

The base substrate 110 may include a transparent material. For example, the base substrate 110 may include quartz, synthetic quartz, calcium fluoride, fluorine doped quartz, soda lime glass, non-alkali glass, or the like.

Alternatively, the base substrate 110 may include a flexible and transparent resin substrate. For example, a polyimide substrate may be an example of the transparent resin substrate which can be used as the base substrate 110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 110 may have a structure in which the first polyimide layer, the barrier film layer, and the second polyimide layer are layered on a glass substrate.

The first touch electrode layer 120a may include silver nanowire. However, the present disclosure is not limited thereto. The first touch electrode layer 120a may include a transparent conductive material. For example, the first touch electrode layer 120a may include indium zinc oxide (IZO) and/or indium tin oxide (ITO).

Referring to FIG. 8, the first touch electrode layer 120a formed on the base substrate 110 may be patterned to form a first touch electrode 120.

The first touch electrode 120 may include a first sensing pattern, a first dummy pattern 125, and a first dummy connector 127. The first sensing pattern may include a plurality of first sensing electrodes 121 and a first sensing connector 123.

The first touch electrode 120 may include silver nanowire. However, the present disclosure is not limited thereto. The first touch electrode 120 may include a transparent conductive material. For example, the first touch electrode 120 may include indium zinc oxide (IZO) and/or indium tin oxide (ITO).

Referring to FIG. 9, a first insulation layer 130 and a second touch electrode layer 140a may be formed on the base substrate 110 on which the first touch electrode 120 is formed.

The first insulation layer 130 may be a photosensitive film. When the first insulation layer 130 is formed as the photosensitive film, the photosensitive film may be used during the formation of the second touch electrode 140, and may serve as an insulation layer insulating the first touch electrode 120 and the second touch electrode 140.

The photosensitive film may replace a conventional insulation layer, so that a thickness of the touch sensing device may be decreased.

The second touch electrode layer 140a may include silver nanowire. However, the present disclosure is not limited thereto. The second touch electrode layer 140a may include a transparent conductive material. For example, the second touch electrode layer 140a may include indium zinc oxide (IZO) and/or indium tin oxide (ITO).

Referring to FIG. 6, the second touch electrode layer 140a formed on the base substrate 110 may be patterned to form the second touch electrode 140.

The second touch electrode 140 may include a second sensing pattern, a second dummy pattern 145, and a second dummy connector 147. The second sensing pattern may include a plurality of second sensing electrodes 141 and a second sensing connector 143.

The second touch electrode 140 may include silver nanowire. However, the present disclosure is not limited thereto. The second touch electrode 140 may include a transparent conductive material. For example, the second touch electrode 140 may include indium zinc oxide (IZO) and/or indium tin oxide (ITO).

Figure 10:
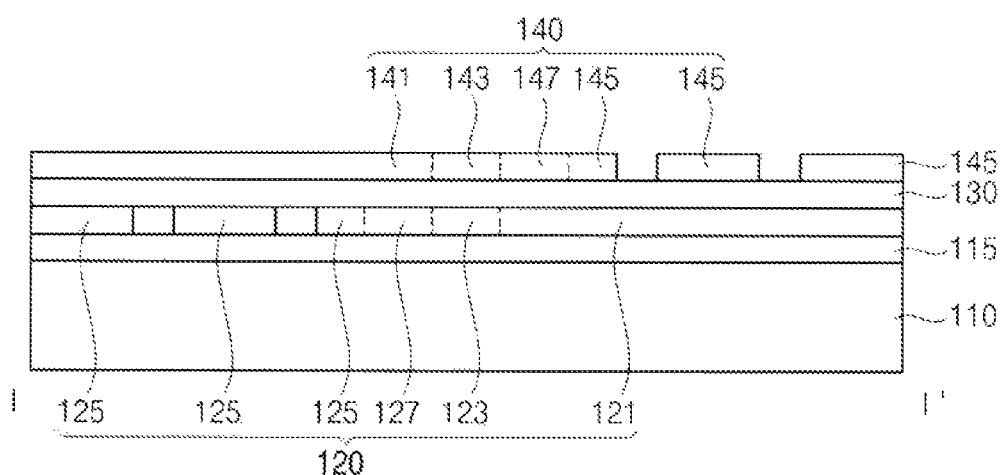
FIG. 10 is a cross-sectional view cut along a line I-I' in FIG. 1.

FIG. 10 is a cross-sectional view cut along a line I-I' in FIG. 1.

A touch sensing device according to an exemplary embodiment, is substantially the same as or similar to the touch sensing device in FIGS. 1, 2, 3, 4, 5, and 6 except for a second insulation layer 115. Therefore, detailed descriptions on the repeated elements and/or constructions are omitted, and like reference numerals are used to designate like elements.

Referring to FIG. 10, the touch sensing device according to an exemplary embodiment, may include a base substrate 110, a second insulation layer 115, a first touch electrode 120, a first insulation layer 130, and a second touch electrode 140.

The second insulation layer 115 may be disposed between the base substrate 110 and the first touch electrode 120. The second insulation layer 115 may be a photosensitive film. When the second insulation layer 115 is formed as the photosensitive film, the photosensitive film may be used during the formation of the first touch electrode 120, and may serve as an insulation layer insulating the base substrate 110 and the first touch electrode 120.

The photosensitive film may replace a conventional insulation layer, so that a thickness of the touch sensing device may be decreased. The second insulation layer 115 may include substantially the same material as the first insulation layer 130.

Figure 11:
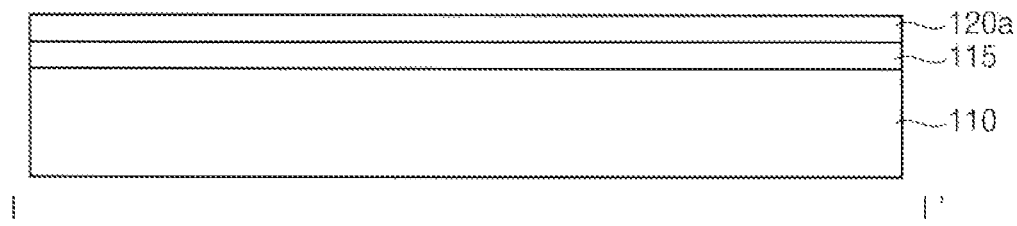
FIGS. 11, 12, and 13 are cross-sectional views illustrating a method of manufacturing a touch sensing device in FIG. 10.
Figure 12:
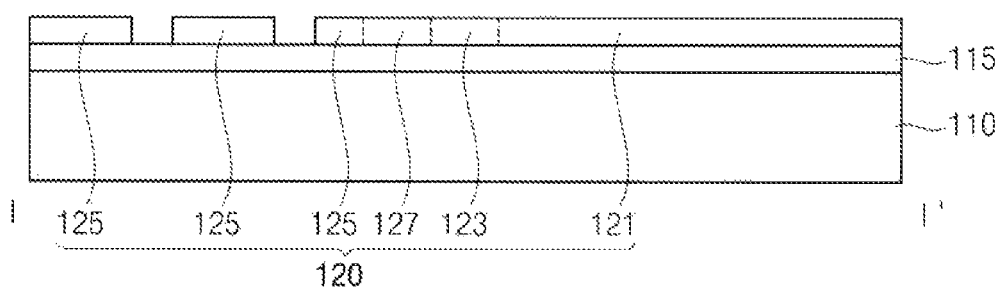
Figure 13:
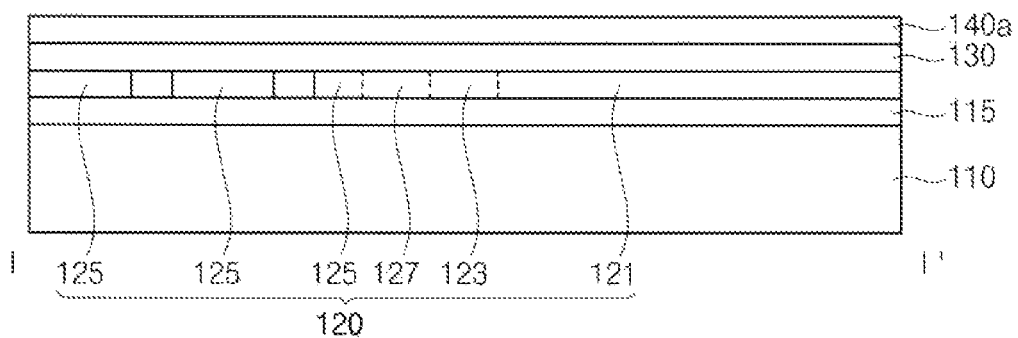

FIGS. 11, 12, and 13 are cross-sectional views illustrating a method of manufacturing a touch sensing device in FIG. 10.

Referring to FIG. 11, a second insulation layer 115 and a first touch electrode layer 120a may be formed on a base substrate 110.

The base substrate 110 may include a transparent material. For example, the base substrate 110 may include quartz, synthetic quartz, calcium fluoride, fluorine doped quartz, soda lime glass, non-alkali glass, or the like.

Alternatively, the base substrate 110 may include a flexible and transparent resin substrate. For example, a polyimide substrate may be an example of the transparent resin substrate which can be used as the base substrate 110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 110 may have a structure in which the first polyimide layer, the barrier film layer, and the second polyimide layer are layered on a glass substrate.

The first touch electrode layer 120a may include silver nanowire. However, the present disclosure is not limited thereto. The first touch electrode layer 120a may include a transparent conductive material. For example, the first touch electrode layer 120a may include indium zinc oxide (IZO) and/or indium tin oxide (ITO).

Referring to FIG. 12, the first touch electrode layer 120a formed on the base substrate 110 and the second insulation layer 115 may be patterned to form a first touch electrode 120.

The first touch electrode 120 may include a first sensing pattern, a first dummy pattern 125, and a first dummy connector 127. The first sensing pattern may include a plurality of first sensing electrodes 121 and a first sensing connector 123.

The first touch electrode 120 may include silver nanowire. However, the present disclosure is not limited thereto. The first touch electrode 120 may include a transparent conductive material. For example, the first touch electrode 120 may include indium zinc oxide (IZO) and/or indium tin oxide (ITO).

Referring to FIG. 13, a first insulation layer 130 and a second touch electrode layer 140a may be formed on the base substrate 110 on which the first touch electrode 120 is formed.

The first insulation layer 130 may be a photosensitive film. When the first insulation layer 130 is formed as the photosensitive film, the photosensitive film may be used during the formation of the second touch electrode 140, and may serve as an insulation layer insulating the first touch electrode 120 and the second touch electrode 140.

The photosensitive film may replace a conventional insulation layer, so that a thickness of the touch sensing device may be decreased.

The second touch electrode layer 140a may include silver nanowire. However, the present disclosure is not limited thereto. The second touch electrode layer 140a may include a transparent conductive material. For example, the second touch electrode layer 140a may include indium zinc oxide (IZO) and/or indium tin oxide (ITO).

Referring to FIG. 10, the second touch electrode layer 140a formed on the base substrate 110 may be patterned to form a second touch electrode 140.

The second touch electrode 140 may include a second sensing pattern, a second dummy pattern 145, and a second dummy connector 147. The second sensing pattern may include a plurality of second sensing electrodes 141 and a second sensing connector 143.

The second touch electrode 140 may include silver nanowire. However, the present disclosure is not limited thereto. The second touch electrode 140 may include a transparent conductive material. For example, the second touch electrode 140 may include indium zinc oxide (IZO) and/or indium tin oxide (ITO).

Figure 14:
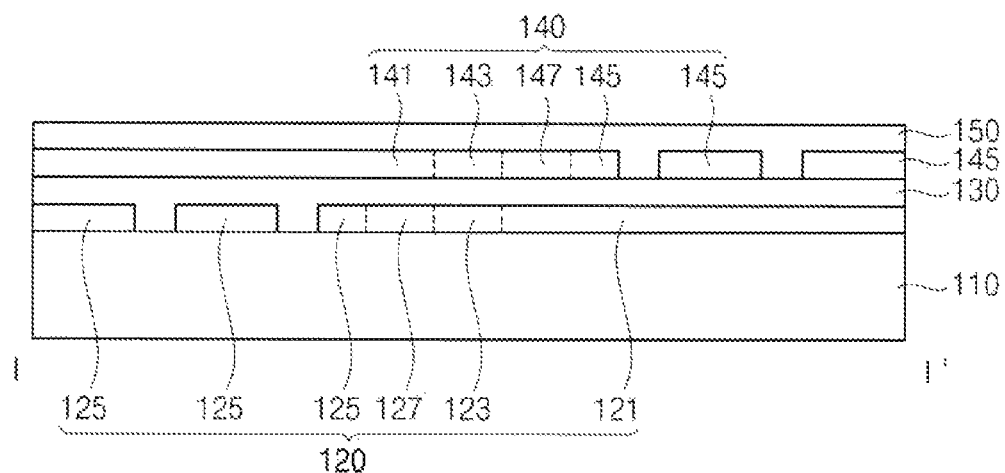
FIG. 14 is a cross-sectional view cut along a line I-I' in FIG. 1.

FIG. 14 is a cross-sectional view cut along a line I-I' in FIG. 1.

A touch sensing device according to an exemplary embodiment, is substantially the same as or similar to the touch sensing device in FIGS. 1 to 6 except for a first insulation layer 130 and a second insulation layer 150. Therefore, detailed descriptions on the repeated elements and/or constructions are omitted, and like reference numerals are used to designate like elements.

Referring to FIG. 14, the touch sensing device according to an exemplary embodiment, may include a base substrate 110, a first touch electrode 120, a first insulation layer 130, a second touch electrode 140, and a second insulation layer 150.

The first insulation layer 130 may include inorganic insulation material. For example, the first insulation layer 130 may include silicon oxide ($SiO_x$) and/or silicon nitride ($SiN_x$). For example, the first insulation layer 130 may have a multi-layered structure including different materials. The first insulation layer 130 may insulate the first touch electrode 120 and the second touch electrode 140.

The second insulation layer 150 may include inorganic insulation material. For example, the second insulation layer 150 may include silicon oxide ($SiO_x$) and/or silicon nitride ($SiN_x$). For example, the second insulation layer 150 may have a multi-layered structure including different materials. The second insulation layer 150 may include substantially the same material as the first insulation layer 130.

Figure 15:
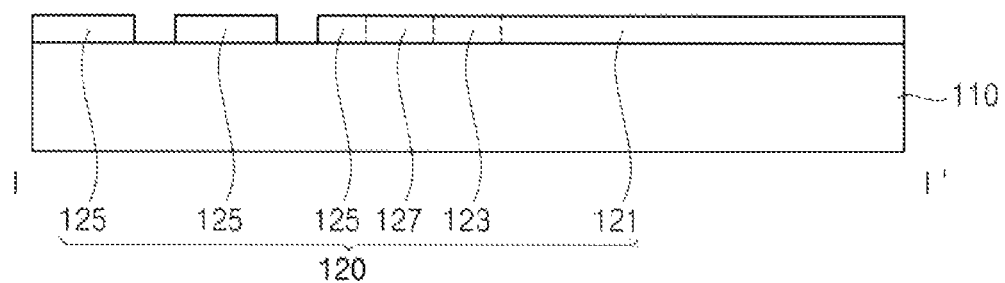
FIGS. 15, 16, and 17 are cross-sectional views illustrating a method of manufacturing a touch sensing device in FIG. 14.
Figure 16:
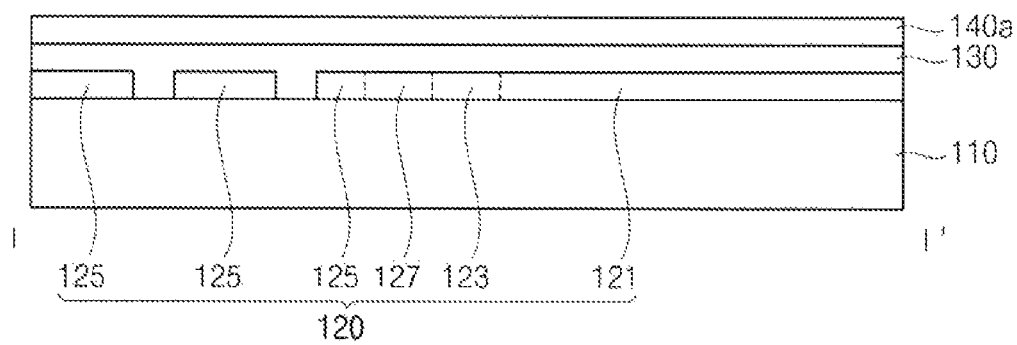
Figure 17:
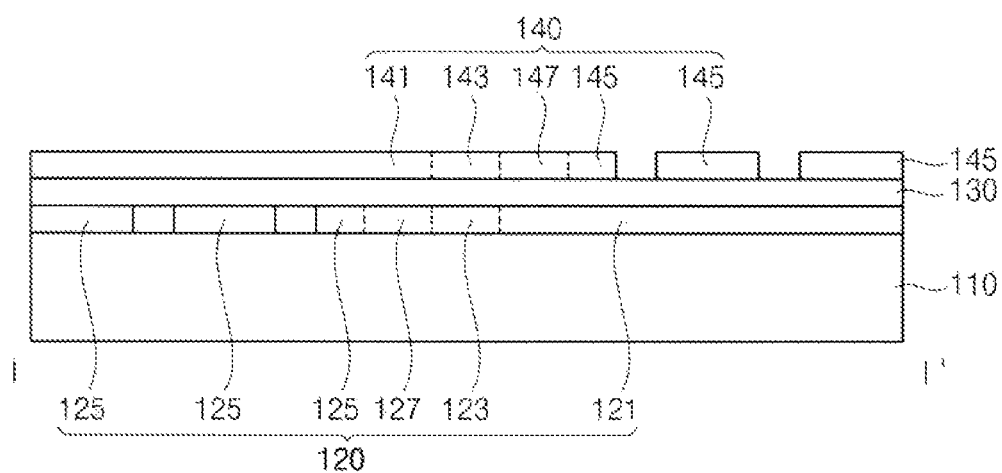

FIGS. 15, 16, and 17 are cross-sectional views illustrating a method of manufacturing a touch sensing device in FIG. 14.

Referring to FIG. 15, a first touch electrode 120 may be formed on a base substrate 110.

The base substrate 110 may include a transparent material. For example, the base substrate 110 may include quartz, synthetic quartz, calcium fluoride, fluorine doped quartz, soda lime glass, non-alkali glass, or the like.

Alternatively, the base substrate 110 may include a flexible and transparent resin substrate. For example, a polyimide substrate may be an example of the transparent resin substrate which can be used as the base substrate 110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 110 may have a structure in which the first polyimide layer, the barrier film layer, and the second polyimide layer are layered on a glass substrate.

The first touch electrode 120 may include a first sensing pattern, a first dummy pattern 125, and a first dummy connector 127. The first sensing pattern may include a plurality of first sensing electrodes 121 and a first sensing connector 123.

The first touch electrode 120 may include silver nanowire. However, the present disclosure is not limited thereto. The first touch electrode 120 may include a transparent conductive material. For example, the first touch electrode 120 may include indium zinc oxide (IZO) and/or indium tin oxide (ITO).

Referring to FIG. 16, a first insulation layer 130 and a second touch electrode layer 140*a* may be formed on the base substrate 110 on which the first touch electrode 120 is formed.

The first insulation layer 130 may include inorganic insulation material. For example, the first insulation layer 130 may include silicon oxide ($SiO_x$) and/or silicon nitride ($SiN_x$). For example, the first insulation layer 130 may have a multi-layered structure including different materials.

The second touch electrode layer 140*a* may include silver nanowire. However, the present disclosure is not limited thereto. The second touch electrode layer 140*a* may include a transparent conductive material. For example, the second touch electrode layer 140*a* may include indium zinc oxide (IZO) and/or indium tin oxide (ITO).

Referring to FIG. 17, the second touch electrode layer 140*a* formed on the base substrate 110 may be patterned to form a second touch electrode 140.

The second touch electrode 140 may include a second sensing pattern, a second dummy pattern 145, and a second dummy connector 147. The second sensing pattern may include a plurality of second sensing electrodes 141 and a second sensing connector 143.

The second touch electrode 140 may include silver nanowire. However, the present disclosure is not limited thereto. The second touch electrode 140 may include a transparent conductive material. For example, the second touch electrode 140 may include indium zinc oxide (IZO) and/or indium tin oxide (ITO).

Referring to FIG. 14, a second insulation layer 150 may be formed on the base substrate 110 on which the second touch electrode 140 is formed.

The second insulation layer 150 may include inorganic insulation material. For example, the second insulation layer 150 may include silicon oxide ($SiO_x$) and/or silicon nitride ($SiN_x$). For example, the second insulation layer 150 may have a multi-layered structure including different materials. The second insulation layer 150 may include substantially the same material as the first insulation layer 130.

Figure 18:
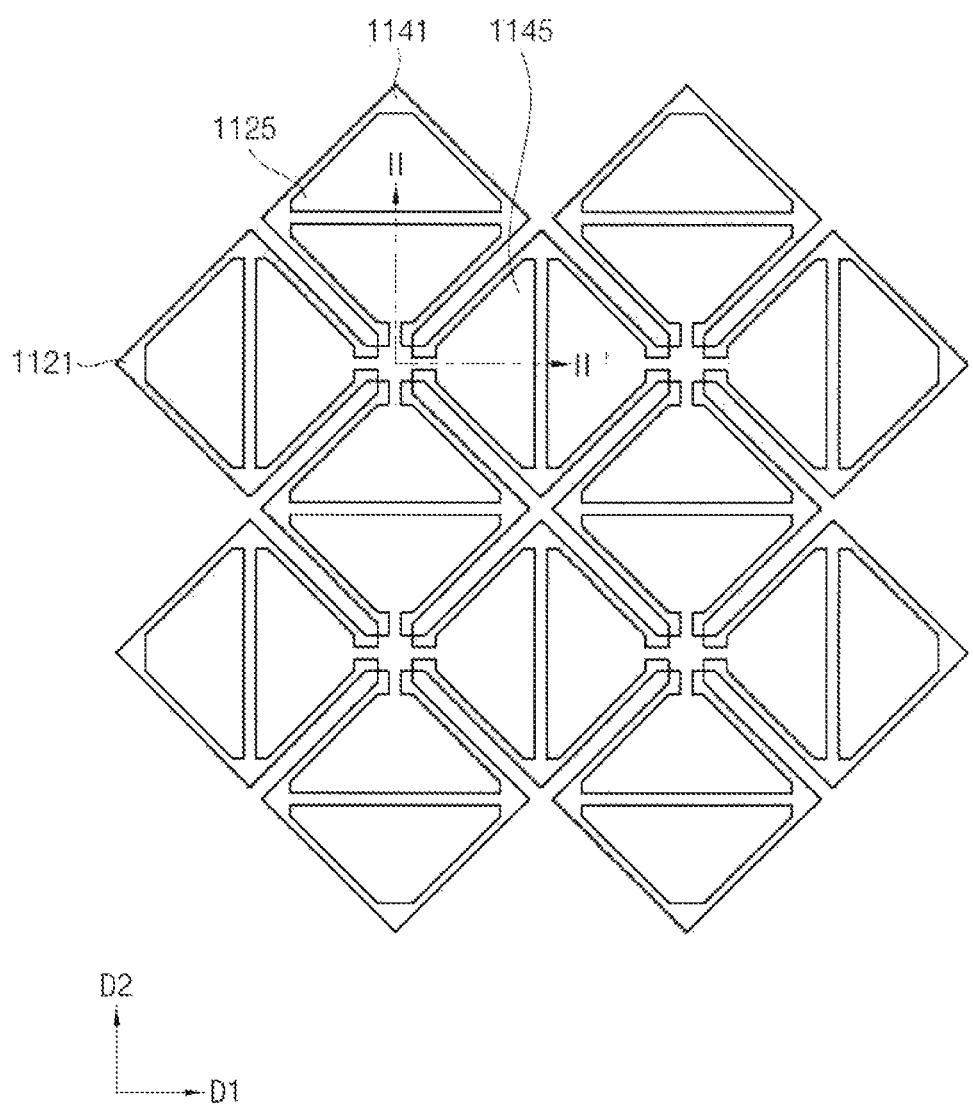
FIG. 18 is a plan view illustrating a touch sensing device in accordance with an exemplary embodiment.
Figure 19:
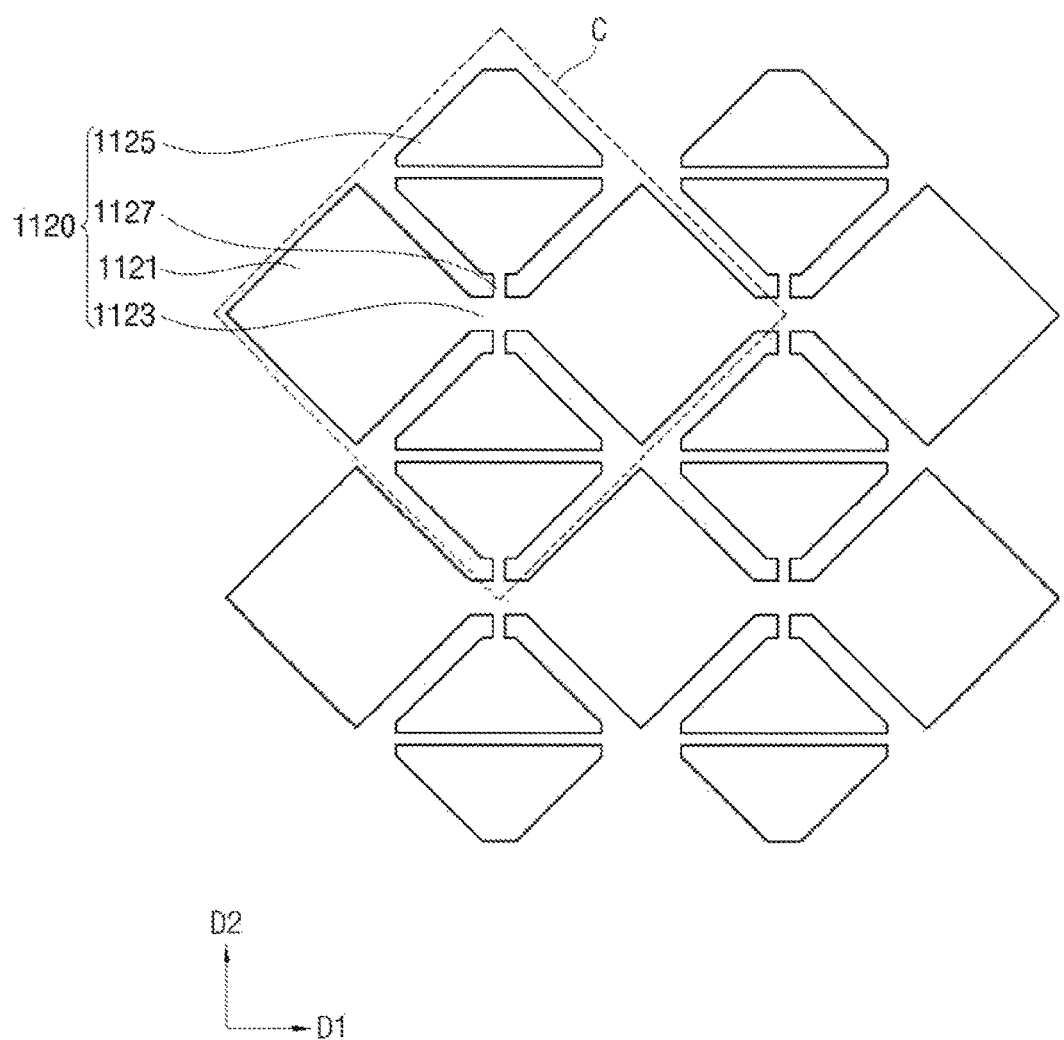
FIG. 19 is a plan view illustrating a first touch electrode in FIG. 18.
Figure 20:
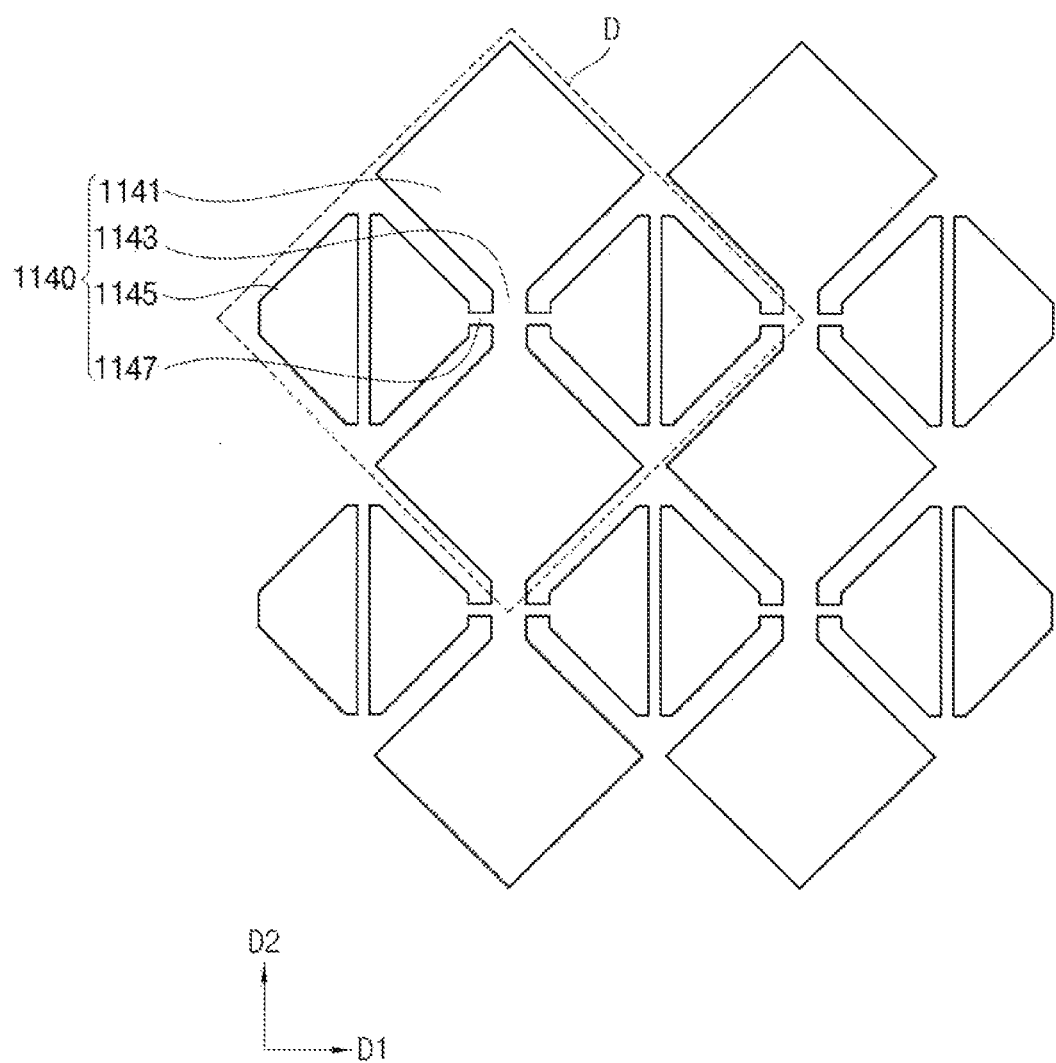
FIG. 20 is a plan view illustrating a second touch electrode in FIG. 18.
Figure 21:
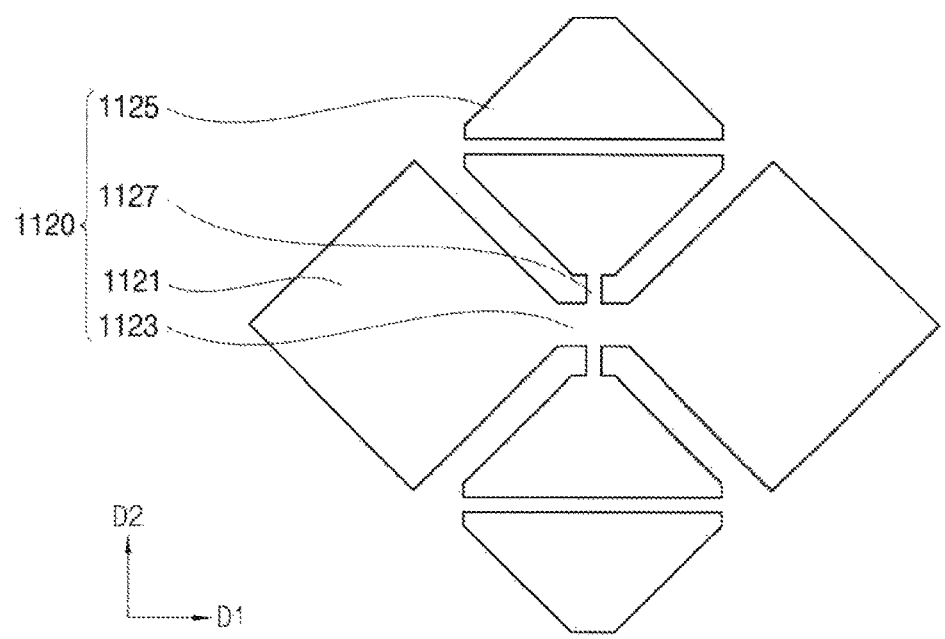
FIG. 21 is a plan view enlarging an area C in FIG. 19.
Figure 22:
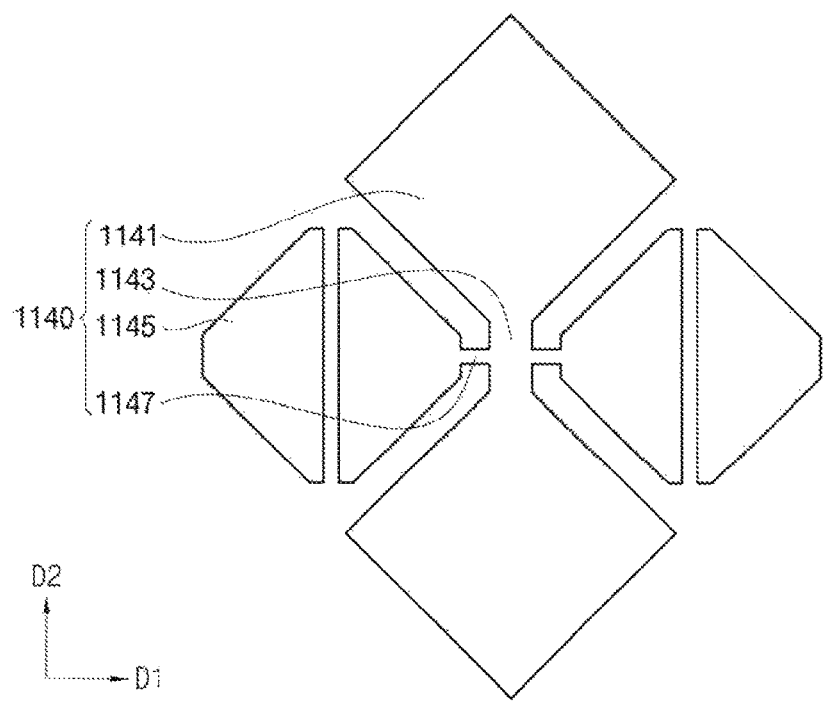
FIG. 22 is a plan view enlarging an area D in FIG. 20.
Figure 23:
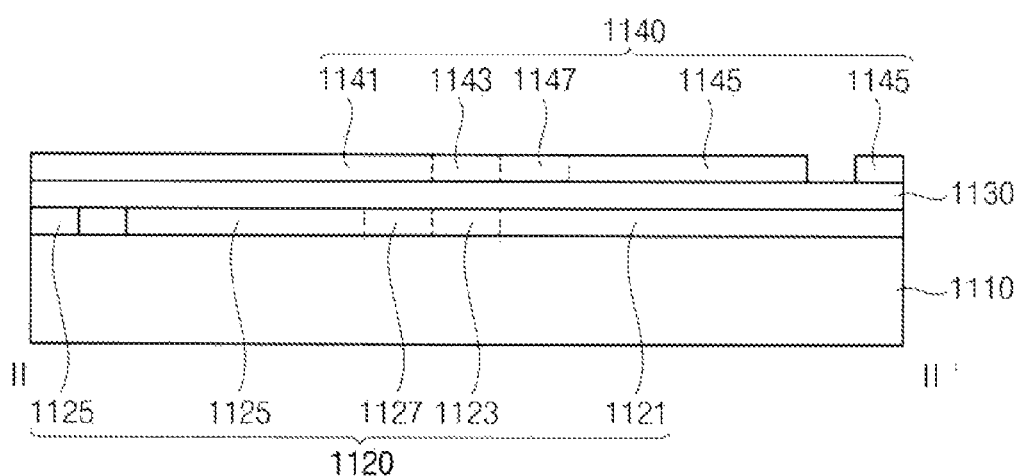
FIG. 23 is a cross-sectional view cut along a line II-II' in FIG. 18.

FIG. 18 is a plan view illustrating a touch sensing device in accordance with an exemplary embodiment. FIG. 19 is a plan view illustrating a first touch electrode in FIG. 18. FIG. 20 is a plan view illustrating a second touch electrode in FIG. 18. FIG. 21 is a plan view enlarging an area C in FIG. 19. FIG. 22 is a plan view enlarging an area D in FIG. 20. FIG. 23 is a cross-sectional view cut along a line II-II' in FIG. 18.

Referring to FIGS. 18 to 23, a touch sensing device in accordance with an exemplary embodiments, may include a base substrate 1110, a first touch electrode 1120, a first insulation layer 1130, and a second touch electrode 1140.

The base substrate 1110 may include a transparent material. For example, the base substrate 1110 may include quartz, synthetic quartz, calcium fluoride, fluorine doped quartz, soda lime glass, non-alkali glass, or the like.

Alternatively, the base substrate 1110 may include a flexible and transparent resin substrate. For example, a polyimide substrate may be an example of the transparent resin substrate which can be used as the base substrate 1110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 1110 may have a structure in which the first polyimide layer, the barrier film layer, and the second polyimide layer are layered on a glass substrate.

The first touch electrode 1120 may be disposed on the base substrate 1110. The first touch electrode 1120 may include a first sensing pattern, a first dummy pattern 1125, and a first dummy connector 1127. The first sensing pattern may include a plurality of first sensing electrodes 1121 and a first sensing connector 1123.

Each of the first sensing electrodes 1121 may be formed in a diamond shape. The first sensing connector 1123 may electrically connect the first sensing electrodes 1121. The first sensing electrodes 1121 may be connected by the first sensing connector 1123 thereby extending along a first direction D1. The first sensing electrodes 1121 may be formed at substantially the same layer as the first sensing connector 1123.

The first dummy pattern 1125 may include a plurality of first sub-dummy patterns which are spaced apart from each other. In an exemplary embodiment, each of the first sub-dummy patterns may be formed in a triangle shape. For example, two first sub-dummy patterns may be closely disposed between the first sensing electrodes 1121. The first dummy pattern 1125 may be formed at substantially the same layer as the first sensing electrodes 1121.

The first sensing connector 1123 may be electrically connected to the first sub-dummy pattern by the first dummy connector 1127.

A width of the first sensing connector 1123 may be less than that of the first sensing electrode 1121. Therefore, an electrical resistance of the first sensing connector 1123 may be greater than that of the first sensing electrode 1121. According, the first sensing connector 1123 may be damaged by electrostatic phenomenon or the like. Additionally, defects on the touch sensing device may be increased by the damage of the first sensing connector 1123.

However, the first sensing connector 1123, according to an exemplary embodiment, may be electrically connected to the first dummy pattern 1125 by the first dummy connector 1127. Accordingly, electrostatic charges may be distributed to the first dummy pattern 1125. Therefore, the first sensing connector 1123 may have a relatively low electrical resistance, and defects on the touch sensing device may be reduced.

The first touch electrode 1120 may include silver nanowire. However, the present disclosure is not limited thereto. The first touch electrode 1120 may include a transparent conductive material. For example, the first touch electrode 1120 may include indium zinc oxide (IZO) and/or indium tin oxide (ITO).

The first insulation layer 1130 may be disposed on the first touch electrode 1120. The first insulation layer 1130 may be a photosensitive film. When the first insulation layer 1130 is formed as the photosensitive film, the photosensitive film may be used during the formation of the second touch electrode 1140, and may serve as an insulation layer insulating the first touch electrode 1120 and the second touch electrode 1140.

The photosensitive film may replace a conventional insulation layer, so that a thickness of the touch sensing device may be decreased.

However, the present disclosure is not limited thereto. The first insulation layer 1130 may include inorganic insulation material. For example, the first insulation layer 1130 may include silicon oxide ($SiO_x$) and/or silicon nitride ($SiN_x$).

For example, the first insulation layer 1130 may have a multi-layered structure including different materials.

The second touch electrode 1140 may be disposed on the first insulation layer 1130. The second touch electrode 1140 may include a second sensing pattern, a second dummy pattern 1145, and a second dummy connector 1147. The second sensing pattern may include a plurality of second sensing electrodes 1141 and a second sensing connector 1143.

Each of the second sensing electrodes 1141 may be formed in a diamond shape. The second sensing connector 1143 may electrically connect the second sensing electrodes 1141. The second sensing electrodes 1141 may be connected by the second sensing connector 1143 thereby extending along a second direction D2 crossing the first direction D1. The second sensing electrodes 1141 may be formed at substantially the same layer as the second sensing connector 1143.

The second dummy pattern 1145 may include a plurality of second sub-dummy patterns which are spaced apart from each other. In an exemplary embodiment, each of the second sub-dummy patterns may be formed in a triangle shape. For example, two second sub-dummy patterns may be closely disposed between the second sensing electrodes 1141. The second dummy pattern 1145 may be formed at substantially the same layer as the second sensing electrodes 1141.

The second sensing connector 1143 may be electrically connected to the second sub-dummy patterns by the second dummy connector 1147.

A width of the second sensing connector 1143 may be less than that of the second sensing electrode 1141. Therefore, an electrical resistance of the second sensing connector 1143 may be greater than that of the second sensing electrode 1141. Accordingly, the second sensing connector 1143 may be damaged by electrostatic phenomenon or the like. Additionally, defects on the touch sensing device may be increased by the damage of the second sensing connector 1143.

However, the second sensing connector 1143 according to an exemplary embodiment, may be electrically connected to the second dummy pattern 1145 by the second dummy connector 1147. Accordingly, electrostatic charges may be distributed to the second dummy pattern 1145. Therefore, the second sensing connector 1143 may have a relatively low electrical resistance, and defects on the touch sensing device may be reduced.

The second touch electrode 1140 may include silver nanowire. However, the present disclosure is not limited thereto. The second touch electrode 1140 may include a transparent conductive material. For example, the second touch electrode 1140 may include indium zinc oxide (IZO) and/or indium tin oxide (ITO).

Figure 24:
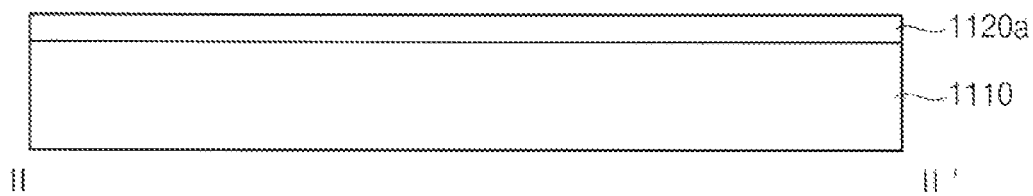
FIGS. 24, 25, and 26 are cross-sectional views illustrating a method of manufacturing a touch sensing device in FIG. 23.
Figure 25:
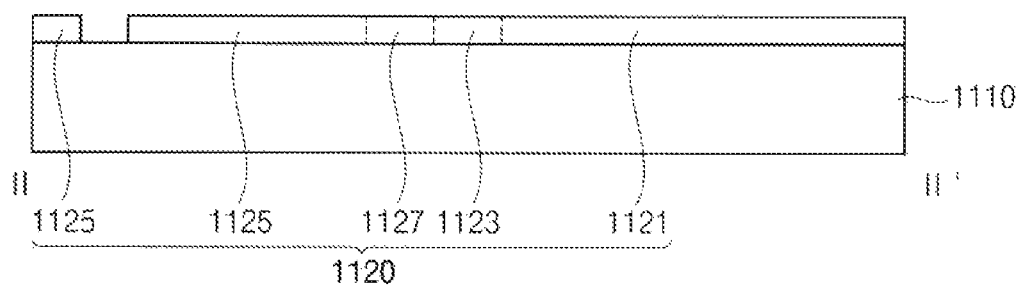
Figure 26:
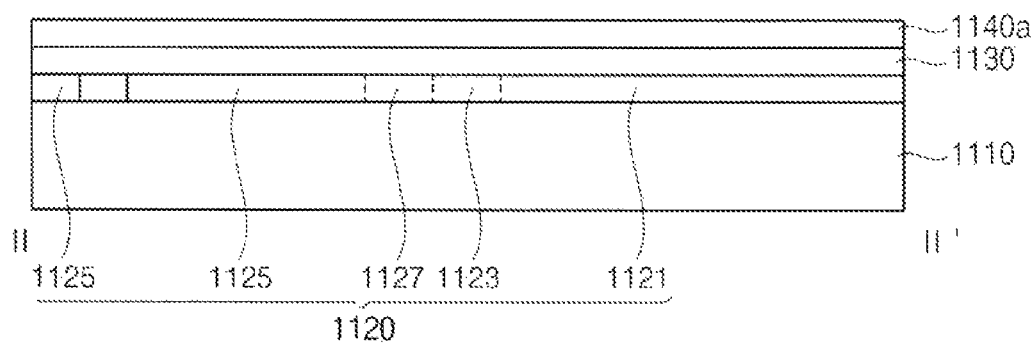

FIGS. 24, 25, and 26 are cross-sectional views illustrating a method of manufacturing a touch sensing device in FIG. 23.

Referring to FIG. 24, a first touch electrode layer 1120*a* may be formed on a base substrate 1110.

The base substrate 1110 may include a transparent material. For example, the base substrate 1110 may include quartz, synthetic quartz, calcium fluoride, fluorine doped quartz, soda lime glass, non-alkali glass, or the like.

Alternatively, the base substrate 1110 may include a flexible and transparent resin substrate. For example, a polyimide substrate may be an example of the transparent resin substrate which can be used as the base substrate 1110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 1110 may have a structure in which the first polyimide layer, the barrier film layer, and the second polyimide layer are layered on a glass substrate.

The first touch electrode layer 1120*a* may include silver nanowire. However, the present disclosure is not limited thereto. The first touch electrode layer 1120*a* may include a transparent conductive material. For example, the first touch electrode layer 1120*a* may include indium zinc oxide (IZO) and/or indium tin oxide (ITO).

Referring to FIG. 25, the first touch electrode layer 1120*a* formed on the base substrate 1110 may be patterned to form a first touch electrode 1120.

The first touch electrode 1120 may include a first sensing pattern, a first dummy pattern 1125, and a first dummy connector 1127. The first sensing pattern may include a plurality of first sensing electrodes 1121 and a first sensing connector 1123.

The first touch electrode 1120 may include silver nanowire. However, the present disclosure is not limited thereto. The first touch electrode 1120 may include a transparent conductive material. For example, the first touch electrode 1120 may include indium zinc oxide (IZO) and/or indium tin oxide (ITO).

Referring to FIG. 26, a first insulation layer 1130 and a second touch electrode layer 1140*a* may be formed on the base substrate 1110 on which the first touch electrode 1120 is formed.

The first insulation layer 1130 may be a photosensitive film. When the first insulation layer 1130 is formed as the photosensitive film, the photosensitive film may be used during the formation of the second touch electrode 1140, and may serve as an insulation layer insulating the first touch electrode 1120 and the second touch electrode 1140.

The photosensitive film may replace a conventional insulation layer, so that a thickness of the touch sensing device may be decreased.

The second touch electrode layer 1140*a* may include silver nanowire. However, the present disclosure is not limited thereto. The second touch electrode layer 1140*a* may include a transparent conductive material. For example, the second touch electrode layer 1140*a* may include indium zinc oxide (IZO) and/or indium tin oxide (ITO).

Referring to FIG. 23, the second touch electrode layer 1140*a* formed on the base substrate 1110 may be patterned to form a second touch electrode 1140.

The second touch electrode 1140 may include a second sensing pattern, a second dummy pattern 1145, and a second dummy connector 1147. The second sensing pattern may include a plurality of second sensing electrodes 1141 and a second sensing connector 1143.

The second touch electrode 1140 may include silver nanowire. However, the present disclosure is not limited thereto. The second touch electrode 1140 may include a transparent conductive material. For example, the second touch electrode 1140 may include indium zinc oxide (IZO) and/or indium tin oxide (ITO).

Figure 27:
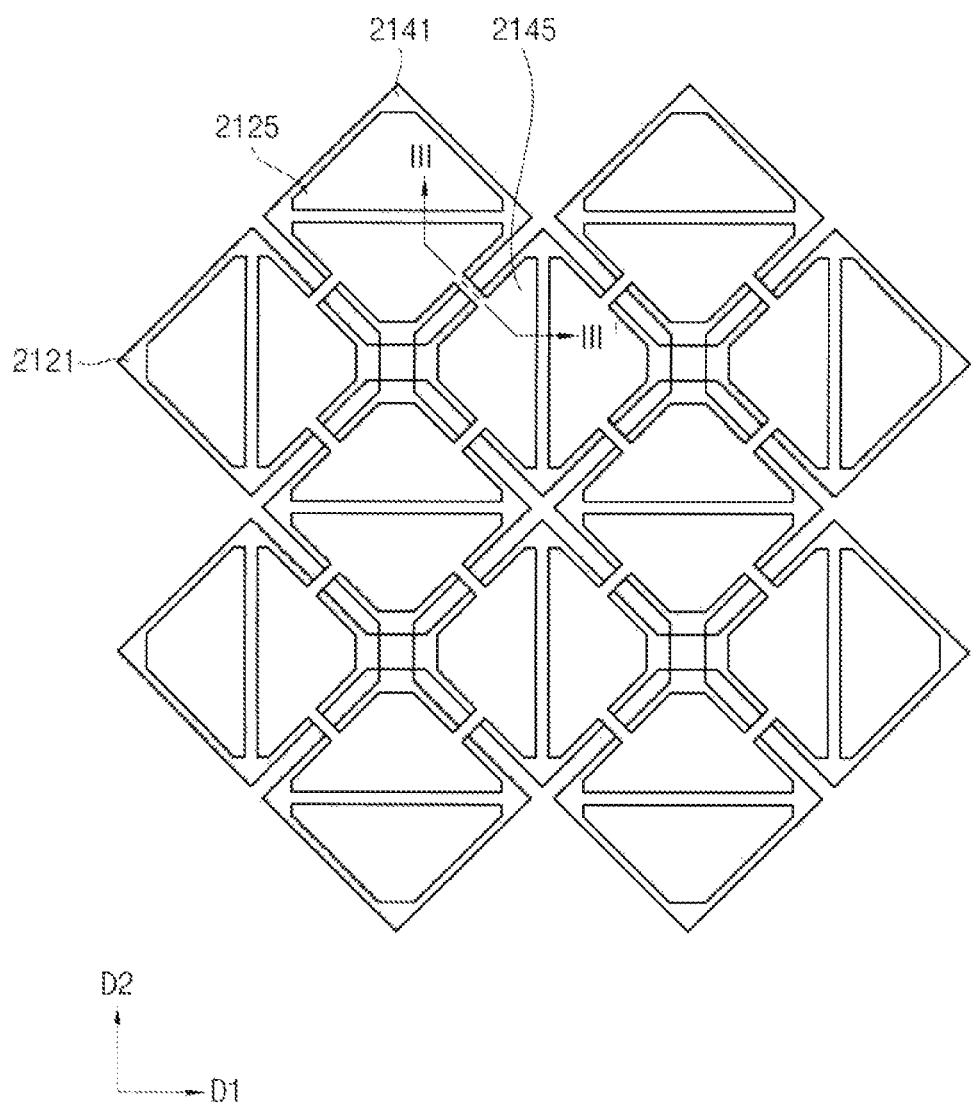
FIG. 27 is a plan view illustrating a touch sensing device in accordance with an exemplary embodiment.
Figure 28:
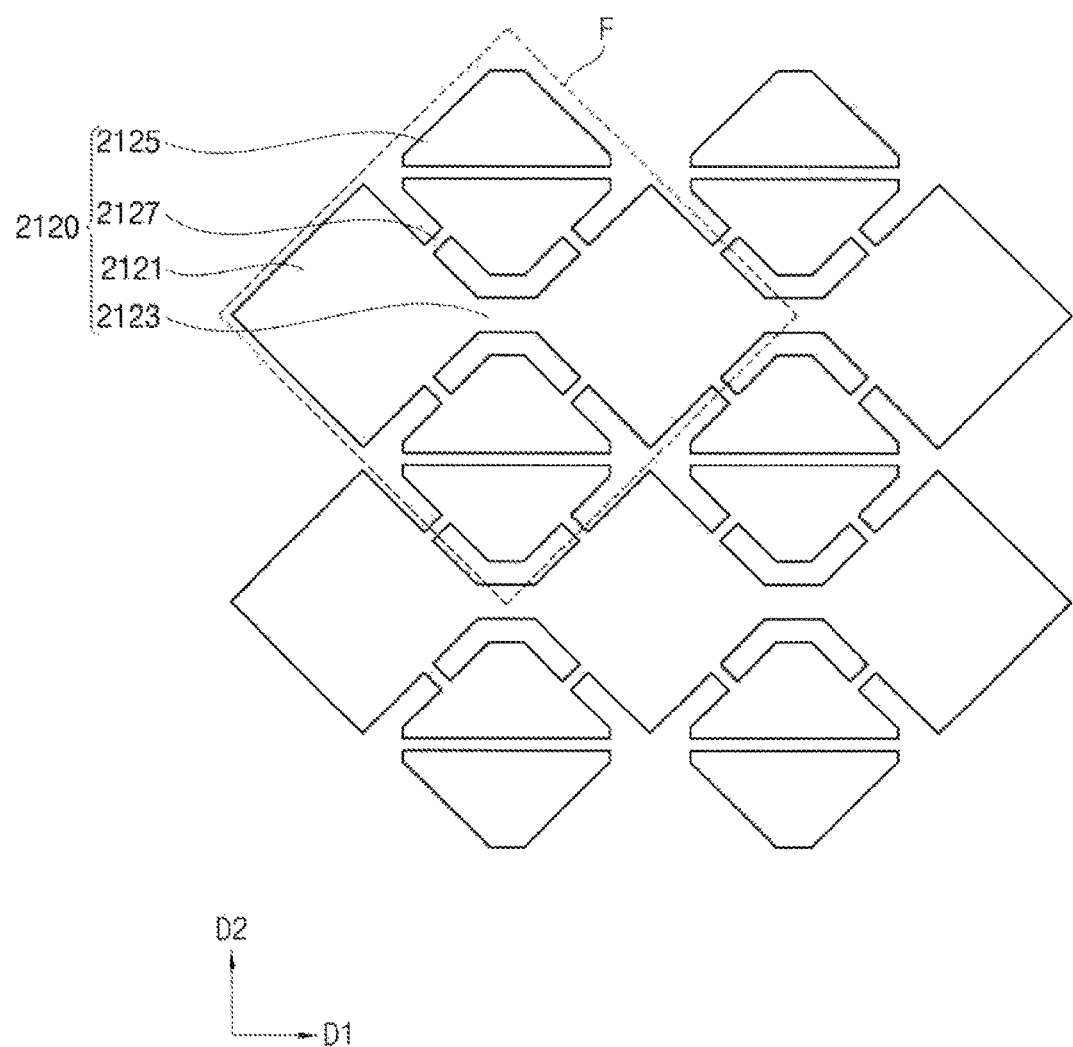
FIG. 28 is a plan view illustrating a first touch electrode in FIG. 27.
Figure 29:
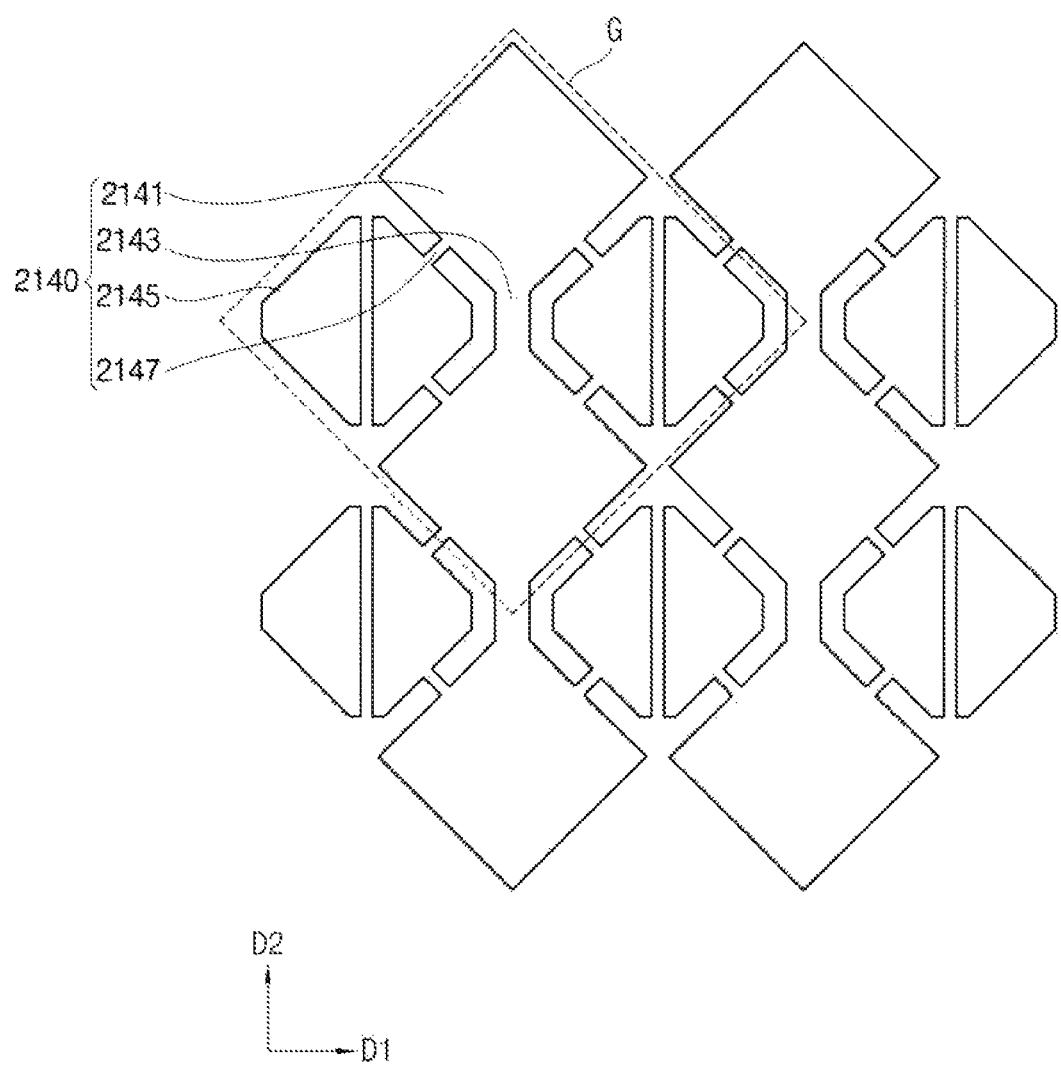
FIG. 29 is a plan view illustrating a second touch electrode in FIG. 27.
Figure 30:
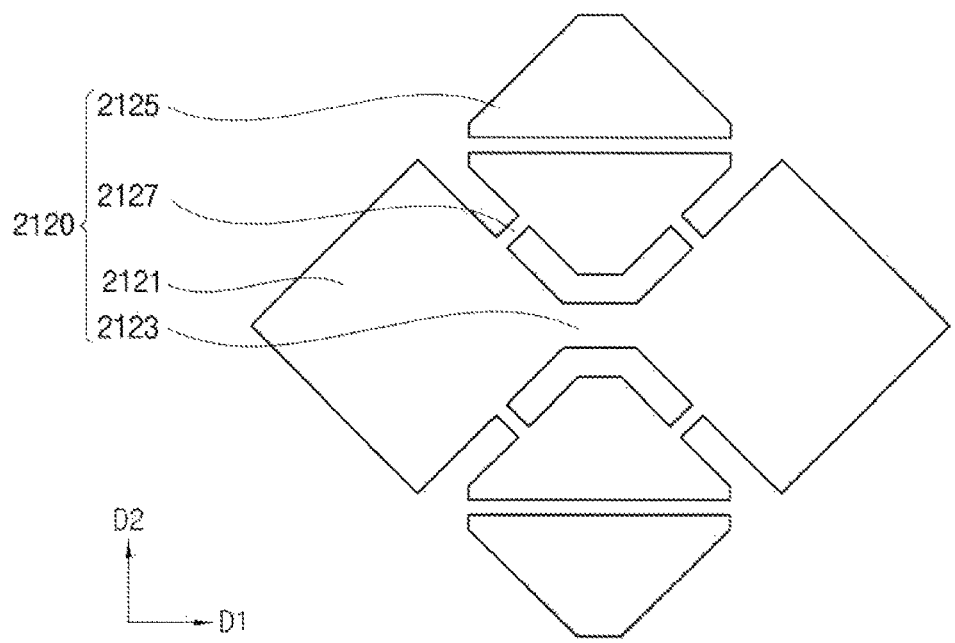
FIG. 30 is a plan view enlarging an area F in FIG. 28.
Figure 31:
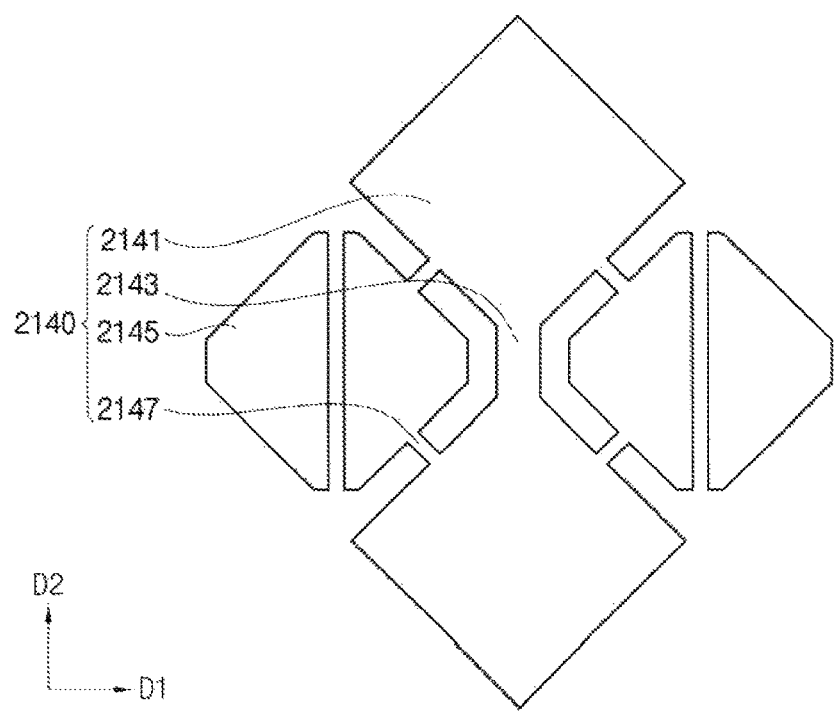
FIG. 31 is a plan view enlarging an area G in FIG. 29.
Figure 32:
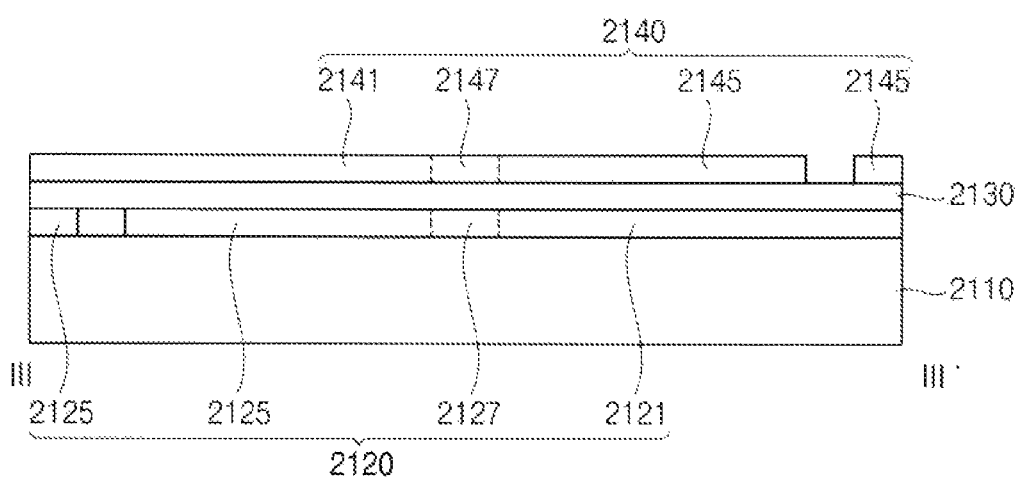
FIG. 32 is a cross-sectional view cut along a line in FIG. 27.

FIG. 27 is a plan view illustrating a touch sensing device in accordance with an exemplary embodiment. FIG. 28 is a plan view illustrating a first touch electrode in FIG. 27. FIG. 29 is a plan view illustrating a second touch electrode in FIG. 27. FIG. 30 is a plan view enlarging an area F in FIG. 28. FIG. 31 is a plan view enlarging an area G in FIG. 29. FIG. 32 is a cross-sectional view cut along a line in FIG. 27.

Referring to FIGS. 27, 28, 29, 30, 31, and 32, a touch sensing device in accordance with an exemplary embodiment, may include a base substrate 2110, a first touch electrode 2120, a first insulation layer 2130, and a second touch electrode 2140.

The base substrate 2110 may include a transparent material. For example, the base substrate 2110 may include quartz, synthetic quartz, calcium fluoride, fluorine doped quartz, soda lime glass, non-alkali glass, or the like.

Alternatively, the base substrate 2110 may include a flexible and transparent resin substrate. For example, a polyimide substrate may be an example of the transparent resin substrate which can be used as the base substrate 2110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 2110 may have a structure in which the first polyimide layer, the barrier film layer, and the second polyimide layer are layered on a glass substrate.

The first touch electrode 2120 may be disposed on the base substrate 2110. The first touch electrode 2120 may include a first sensing pattern, a first dummy pattern 2125, and a first dummy connector 2127. The first sensing pattern may include a plurality of first sensing electrodes 2121 and a first sensing connector 2123.

Each of the first sensing electrodes 2121 may be formed in a diamond shape. The first sensing connector 2123 may electrically connect the first sensing electrodes 2121. The first sensing electrodes 2121 may be connected by the first sensing connector 2123 thereby extending along a first direction D1. The first sensing electrodes 2121 may be formed at substantially the same layer as the first sensing connector 2123.

The first dummy pattern 2125 may include a plurality of first sub-dummy patterns which are spaced apart from each other. In an exemplary embodiment, each of the first sub-dummy patterns may be formed in a triangle shape. For example, two first sub-dummy patterns may be closely disposed between the first sensing electrodes 2121. The first dummy pattern 2125 may be formed at substantially the same layer as the first sensing electrodes 2121.

The first dummy connector 2127 may electrically connect the first dummy pattern 2125 to the first sensing electrodes 2121 which are connected by the first sensing connector 2123 at two points on the first sensing electrodes 2121 which are spaced apart from the first sensing connector 2123 by predetermined distances, respectively.

A width of the first sensing connector 2123 may be less than that of the first sensing electrode 2121. Therefore, an electrical resistance of the first sensing connector 2123 may be greater than that of the first sensing electrode 2121. According, the first sensing connector 2123 may be damaged by electrostatic phenomenon or the like. Additionally, defects on the touch sensing device may be increased by the damage of the first sensing connector 2123.

However, the first dummy connector 2127, according to an exemplary embodiment, may electrically connect the first dummy pattern 2125 to the first sensing electrodes 2121 which are connected by the first sensing connector 2123 at the two points on the first sensing electrodes 2121 which are spaced apart from the first sensing connector 2123 by the predetermined distances, respectively. Accordingly, even though the first sensing connector 2123 is damaged, a signal may bypass through the first dummy pattern 2125. Therefore, defects on the touch sensing device may be reduced.

The first touch electrode 2120 may include silver nanowire. However, the present disclosure is not limited thereto. The first touch electrode 2120 may include a transparent conductive material. For example, the first touch electrode 2120 may include indium zinc oxide (IZO) and/or indium tin oxide (ITO).

The first insulation layer 2130 may be disposed on the first touch electrode 2120. The first insulation layer 2130 may be a photosensitive film. When the first insulation layer 2130 is formed as the photosensitive film, the photosensitive film may be used during the formation of the second touch electrode 2140, and may serve as an insulation layer insulating the first touch electrode 2120 and the second touch electrode 2140.

The photosensitive film may replace a conventional insulation layer, so that a thickness of the touch sensing device may be decreased.

However, the present disclosure is not limited thereto. The first insulation layer 2130 may include inorganic insulation material. For example, the first insulation layer 2130 may include silicon oxide ($SiO_x$) and/or silicon nitride ($SiN_x$). For example, the first insulation layer 2130 may have a multi-layered structure including different materials.

The second touch electrode 2140 may be disposed on the first insulation layer 2130. The second touch electrode 2140 may include a second sensing pattern, a second dummy pattern 2145, and a second dummy connector 2147. The second sensing pattern may include a plurality of second sensing electrodes 2141 and a second sensing connector 2143.

Each of the second sensing electrodes 2141 may be formed in a diamond shape. The second sensing connector 2143 may electrically connect the second sensing electrodes 2141. The second sensing electrodes 2141 may be connected by the second sensing connector 2143 thereby extending along a second direction D2 crossing the first direction D1. The second sensing electrodes 2141 may be formed at substantially the same layer as the second sensing connector 2143.

The second dummy pattern 2145 may include a plurality of second sub-dummy patterns which are spaced apart from each other. In an exemplary embodiment, each of the second sub-dummy patterns may be formed in a triangle shape. For example, two second sub-dummy patterns may be closely disposed between the second sensing electrodes 2141. The second dummy pattern 2145 may be formed at substantially the same layer as the second sensing electrodes 2141.

The second dummy connector 2147 may electrically connect the second dummy pattern 2145 to the second sensing electrodes 2141 which are connected by the second sensing connector 2143 at two points on the second sensing electrodes 2141 which are spaced apart from the second sensing connector 2143 in predetermined distances, respectively.

A width of the second sensing connector 2143 may be less than that of the second sensing electrode 2141. Therefore, an electrical resistance of the second sensing connector 2143 may be greater than that of the second sensing electrode 2141. Accordingly, the second sensing connector 2143 may be damaged by electrostatic phenomenon or the like. Additionally, defects on the touch sensing device may be increased by the damage of the second sensing connector 2143.

However, the second dummy connector, 2147 according to an exemplary embodiment, may electrically connect the second dummy pattern 2145 to the second sensing electrodes 2141 which are connected by the second sensing connector 2143 at the two points on the second sensing electrodes 2141 which are spaced apart from the second sensing connector 2143 in the predetermined distances, respectively. Accordingly, even though the second sensing connector 2143 is damaged, a signal may bypass through the second dummy pattern 2145. Therefore, defects on the touch sensing device may be reduced.

The second touch electrode 2140 may include silver nanowire. However, the present disclosure is not limited thereto. The second touch electrode 2140 may include a transparent conductive material. For example, the second touch electrode 2140 may include indium zinc oxide (IZO) and/or indium tin oxide (ITO).

Figure 33:
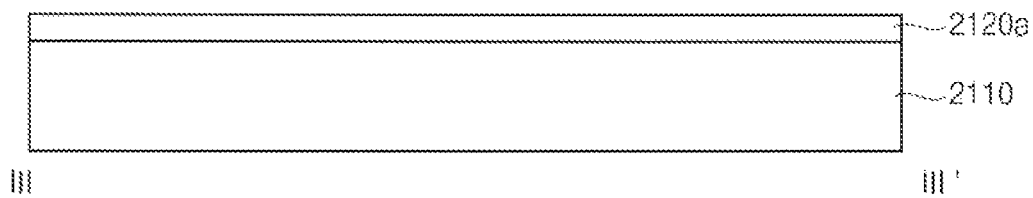
FIGS. 33, 34, and 35 are cross-sectional views illustrating a method of manufacturing a touch sensing device in FIG. 32.
Figure 34:
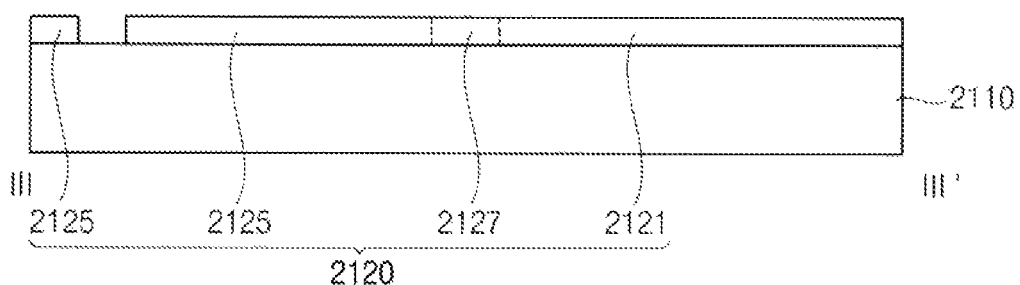
Figure 35:
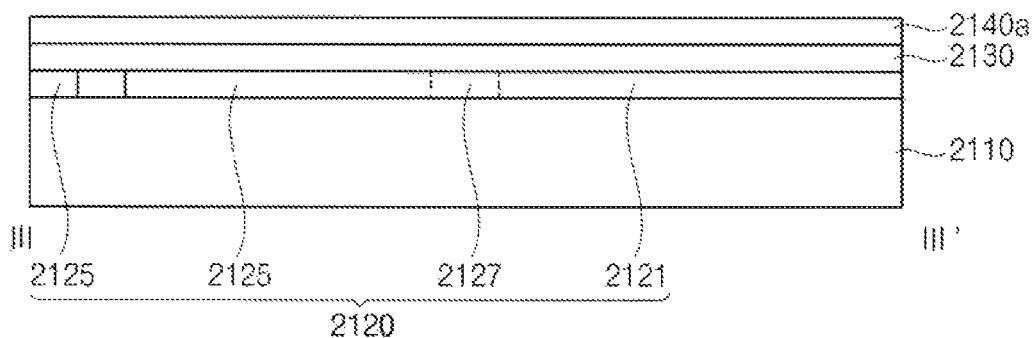

FIGS. 33, 34, and 35 are cross-sectional views illustrating a method of manufacturing a touch sensing device in FIG. 32.

Referring to FIG. 33, a first touch electrode layer 2120a may be formed on a base substrate 2110.

The base substrate 2110 may include a transparent material. For example, the base substrate 2110 may include quartz, synthetic quartz, calcium fluoride, fluorine doped quartz, soda lime glass, non-alkali glass, or the like.

Alternatively, the base substrate 2110 may include a flexible and transparent resin substrate. For example, a polyimide substrate may be an example of the transparent resin substrate which can be used as the base substrate 2110. In this case, the polyimide substrate may include a first polyimide layer, a barrier film layer, a second polyimide layer, etc. When the polyimide substrate is thin and flexible, the polyimide substrate may be formed on solid glass to support the formation of a light emitting structure.

In other words, in exemplary embodiments, the base substrate 2110 may have a structure in which the first polyimide layer, the barrier film layer, and the second polyimide layer are layered on a glass substrate.

The first touch electrode layer 2120a may include silver nanowire. However, the present disclosure is not limited thereto. The first touch electrode layer 2120a may include a transparent conductive material. For example, the first touch electrode layer 2120a may include indium zinc oxide (IZO) and/or indium tin oxide (ITO).

Referring to FIG. 34, the first touch electrode layer 2120a formed on the base substrate 2110 may be patterned to form a first touch electrode 2120.

The first touch electrode 2120 may include a first sensing pattern, a first dummy pattern 2125, and a first dummy connector 2127. The first sensing pattern may include a plurality of first sensing electrodes 2121 and a first sensing connector 2123.

The first touch electrode 2120 may include silver nanowire. However, the present disclosure is not limited thereto. The first touch electrode 2120 may include a transparent conductive material. For example, the first touch electrode 2120 may include indium zinc oxide (IZO) and/or indium tin oxide (ITO).

Referring to FIG. 35, a first insulation layer 2130 and a second touch electrode layer 2140a may be formed on the base substrate 2110 on which the first touch electrode 2120 is formed.

The first insulation layer 2130 may be a photosensitive film. When the first insulation layer 2130 is formed as the photosensitive film, the photosensitive film may be used during the formation of the second touch electrode 2140, and may serve as an insulation layer insulating the first touch electrode 2120 and the second touch electrode 2140.

The photosensitive film may replace a conventional insulation layer, so that a thickness of the touch sensing device may be decreased.

The second touch electrode layer 2140a may include silver nanowire. However, the present disclosure is not limited thereto. The second touch electrode layer 2140a may include a transparent conductive material. For example, the second touch electrode layer 2140a may include indium zinc oxide (IZO) and/or indium tin oxide (ITO).

Referring to FIG. 32, the second touch electrode layer 2140a formed on the base substrate 2110 may be patterned to form a second touch electrode 2140.

The second touch electrode 2140 may include a second sensing pattern, a second dummy pattern 2145, and a second dummy connector 2147. The second sensing pattern may include a plurality of second sensing electrodes 2141 and a second sensing connector 2143.

The second touch electrode 2140 may include silver nanowire. However, the present disclosure is not limited thereto. The second touch electrode 2140 may include a transparent conductive material. For example, the second touch electrode 2140 may include indium zinc oxide (IZO) and/or indium tin oxide (ITO).

Figure 36:
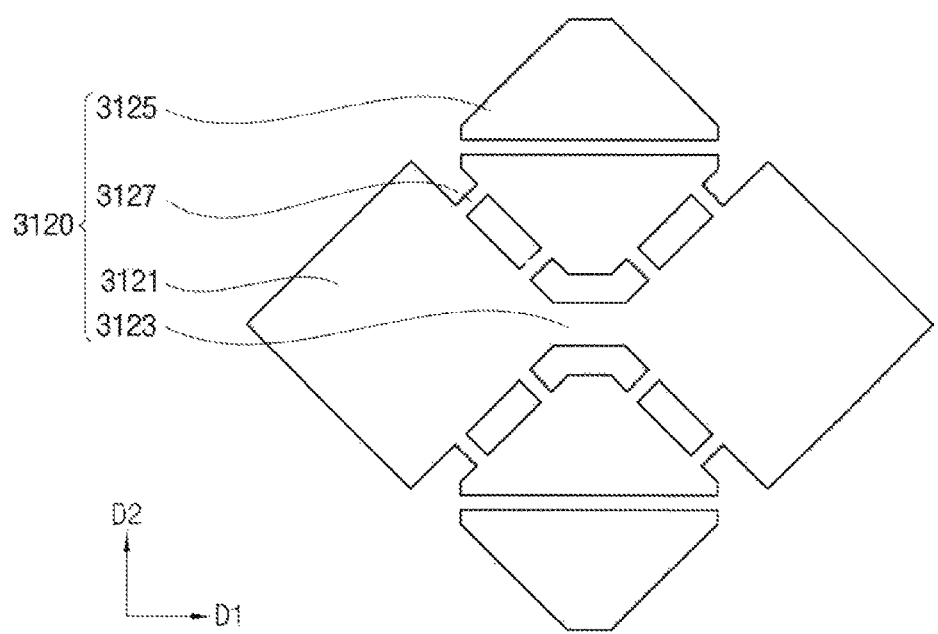
FIG. 36 is a plan view illustrating a first touch electrode of a touch sensing device in accordance with an exemplary embodiment.

FIG. 36 is a plan view illustrating a first touch electrode of a touch sensing device in accordance with an exemplary embodiment.

A touch sensing device according to an exemplary embodiment, is substantially the same as or similar to the touch sensing device in FIGS. 27, 28, 29, 30, 31, and 32 except for a first dummy connector 3127. Therefore, detailed descriptions on the repeated elements and/or constructions are omitted, and like reference numerals are used to designate like elements.

Referring to FIG. 36, the first touch electrode 3120 may include a first sensing pattern, a first dummy pattern 3125, and the first dummy connector 3127. The first sensing pattern may include a plurality of first sensing electrodes 3121 and a first sensing connector 3123.

In an exemplary embodiment, the first touch electrode 3120 may include four first dummy connectors 3127 connected to one first dummy pattern 3125.

The first dummy connector 3127 may electrically connect the first dummy pattern 3125 to the first sensing electrodes 3121 which are connected by the first sensing connector 3123 at four points on the first sensing electrodes 3121 which are spaced apart from the first sensing connector 3123 by predetermined distances, respectively.

A width of the first sensing connector 3123 may be less than that of the first sensing electrode 3121. Therefore, an electrical resistance of the first sensing connector 3123 may be greater than that of the first sensing electrode 3121. According, the first sensing connector 3123 may be damaged by electrostatic phenomenon or the like. Additionally, defects on the touch sensing device may be increased by the damage of the first sensing connector 3123.

However, the first dummy connector 3127, according to an exemplary embodiment, may electrically connect the first dummy pattern 3125 to the first sensing electrodes 3121 which are connected by the first sensing connector 3123 at the four points on the first sensing electrodes 3121 which are spaced apart from the first sensing connector 3123 by the predetermined distances, respectively. Accordingly, even though the first sensing connector 3123 is damaged, a signal may bypass through the first dummy pattern 3125. Therefore, defects on the touch sensing device may be reduced.

Figure 37:
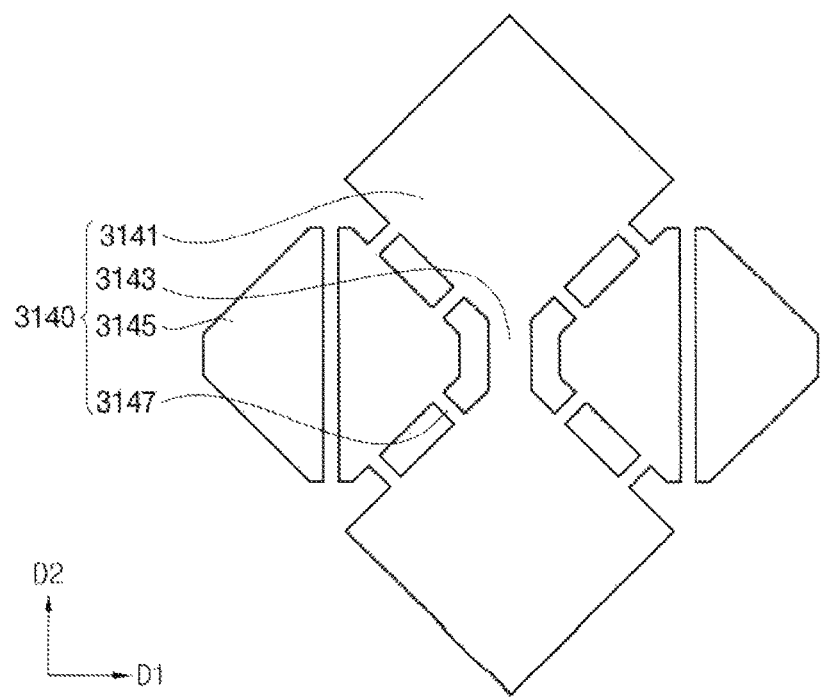
FIG. 37 is a plan view illustrating a second touch electrode of a touch sensing device in accordance with an exemplary embodiment.

FIG. 37 is a plan view illustrating a second touch electrode of a touch sensing device in accordance with an exemplary embodiment.

A touch sensing device according to an exemplary embodiment, is substantially the same as or similar to the touch sensing device in FIGS. 27, 28, 29, 30, 31, and 32 except for a second dummy connector 3147. Therefore, detailed descriptions on the repeated elements and/or constructions are omitted, and like reference numerals are used to designate like elements.

Referring to FIG. 37, the second touch electrode 3140 may include a second sensing pattern, a second dummy pattern 3145, and the second dummy connector 3147. The second sensing pattern may include a plurality of second sensing electrodes 3141 and a second sensing connector 3143.

In an exemplary embodiment, the second touch electrode 3140 may include four second dummy connectors 3147 connected to one second dummy pattern 3145.

The second dummy connector 3147 may electrically connect the second dummy pattern 3145 to the second sensing electrodes 3141 which are connected by the second sensing connector 3143 at four points on the second sensing electrodes 3141 which are spaced apart from the second sensing connector 3143 in predetermined distances, respectively.

A width of the second sensing connector 3143 may be less than that of the second sensing electrode 3141. Therefore, an electrical resistance of the second sensing connector 3143 may be greater than that of the second sensing electrode 3141. According, the second sensing connector 3143 may be damaged by electrostatic phenomenon or the like. Additionally, defects on the touch sensing device may be increased by the damage of the second sensing connector 3143.

However, the second dummy connector 3147, according to an exemplary embodiment, may electrically connect the second dummy pattern 3145 to the second sensing electrodes 3141 which are connected by the second sensing connector 3143 at the four points on the second sensing electrodes 3141 which are spaced apart from the second sensing connector 3143 in the predetermined distances, respectively. Accordingly, even though the second sensing connector 3143 is damaged, a signal may bypass through the second dummy pattern 3145. Therefore, defects on the touch sensing device may be reduced.

Figure 38:
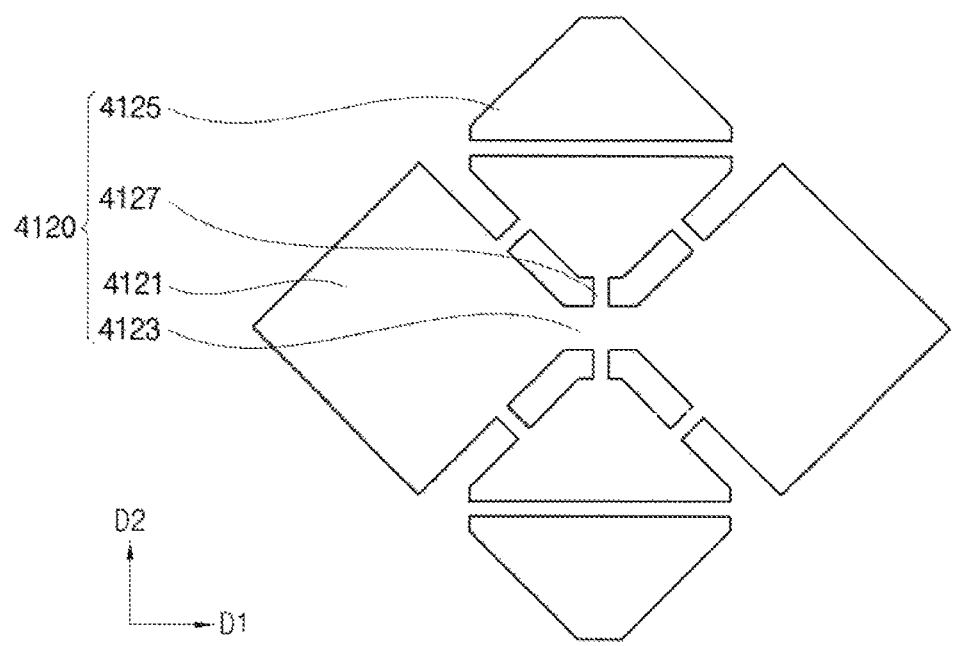
FIG. 38 is a plan view illustrating a first touch electrode of a touch sensing device in accordance with an exemplary embodiment.

FIG. 38 is a plan view illustrating a first touch electrode of a touch sensing device in accordance with an exemplary embodiment.

A touch sensing device according to an exemplary embodiment, is substantially the same as or similar to the touch sensing device in FIGS. 27, 28, 29, 30, 31, and 32 except for a first dummy connector 4127. Therefore, detailed descriptions on the repeated elements and/or constructions are omitted, and like reference numerals are used to designate like elements.

Referring to FIG. 38, the first touch electrode 4120 may include a first sensing pattern, a first dummy pattern 4125, and the first dummy connector 4127. The first sensing pattern may include a plurality of first sensing electrodes 4121 and a first sensing connector 4123.

In an exemplary embodiment, the first touch electrode 4120 may include three first dummy connectors 4127 connected to one first dummy pattern 4125.

The first dummy connector 4127 may electrically connect the first dummy pattern 4125 to the first sensing electrodes 4121 which are connected by the first sensing connector 4123 at two points on the first sensing electrodes 4121 which are spaced apart from the first sensing connector 4123 by predetermined distances and at one point on the first sensing connector 4123, respectively.

A width of the first sensing connector 4123 may be less than that of the first sensing electrode 4121. Therefore, an electrical resistance of the first sensing connector 4123 may be greater than that of the first sensing electrode 4121. According, the first sensing connector 4123 may be damaged by electrostatic phenomenon or the like. Additionally, defects on the touch sensing device may be increased by the damage of the first sensing connector 4123.

However, the first dummy connector 4127 according to an exemplary embodiment, may electrically connect the first dummy pattern 4125 to the first sensing electrodes 4121 which are connected by the first sensing connector 4123 at the two points on the first sensing electrodes 4121 which are spaced apart from the first sensing connector 4123 by predetermined distances and at the one point on the first sensing connector 4123, respectively. Accordingly, even though the first sensing connector 4123 is damaged, a signal may bypass through the first dummy pattern 4125. Therefore, defects on the touch sensing device may be reduced.

Figure 39:
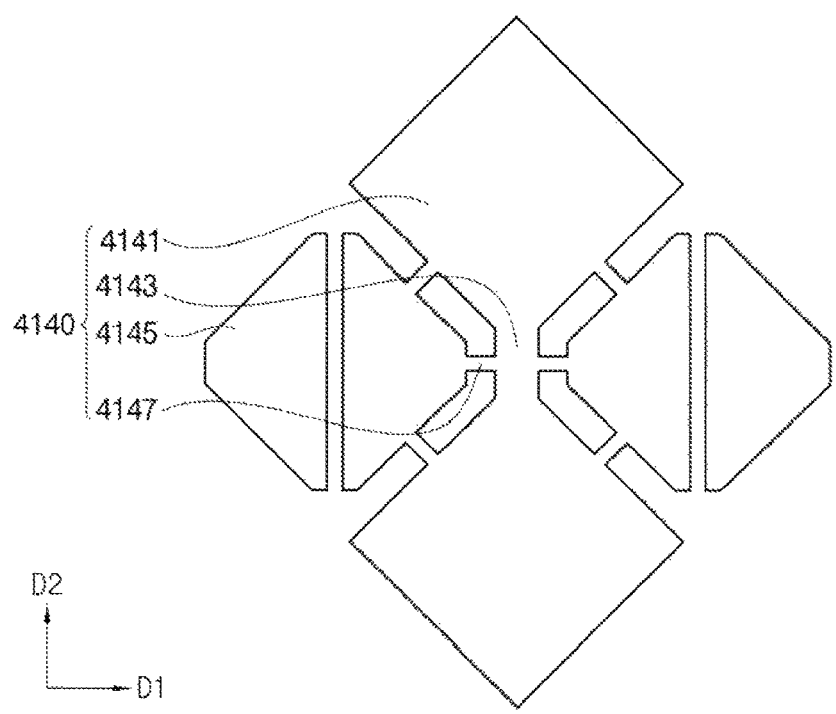
FIG. 39 is a plan view illustrating a second touch electrode of a touch sensing device in accordance with an exemplary embodiment.

FIG. 39 is a plan view illustrating a second touch electrode of a touch sensing device in accordance with an exemplary embodiment.

A touch sensing device according to an exemplary embodiment, is substantially the same as or similar to the touch sensing device in FIGS. 27, 28, 29, 30, 31, and 32 except for a second dummy connector 4147. Therefore, detailed descriptions on the repeated elements and/or constructions are omitted, and like reference numerals are used to designate like elements.

Referring to FIG. 39, the second touch electrode 4140 may include a second sensing pattern, a second dummy pattern 4145, and the second dummy connector 4147. The second sensing pattern may include a plurality of second sensing electrodes 4141 and a second sensing connector 4143.

In an exemplary embodiment, the second touch electrode 4140 may include three second dummy connectors 4147 connected to one second dummy pattern 4145.

The second dummy connector 4147 may electrically connect the second dummy pattern 4145 to the second sensing electrodes 4141 which are connected by the second sensing connector 4143 at two points on the second sensing electrodes 4141 which are spaced apart from the second sensing connector 4143 in predetermined distances and at one point on the second sensing connector 4143, respectively.

A width of the second sensing connector 4143 may be less than that of the second sensing electrode 4141. Therefore, an electrical resistance of the second sensing connector 4143 may be greater than that of the second sensing electrode 4141. According, the second sensing connector 4143 may be damaged by electrostatic phenomenon or the like. Additionally, defects on the touch sensing device may be increased by the damage of the second sensing connector 4143.

However, the second dummy connector 4147 according to an exemplary embodiment, may electrically connect the second dummy pattern 4145 to the second sensing electrodes 4141 which are connected by the second sensing connector 4143 at the two points on the second sensing electrodes 4141 which are spaced apart from the second sensing connector 4143 in predetermined distances and at the one point on the second sensing connector 4143, respectively. Accordingly, even though the second sensing connector 4143 is damaged, a signal may bypass through the second dummy pattern 4145. Therefore, defects on the touch sensing device may be reduced.

According to exemplary embodiments, the dummy pattern of the touch sensing device may be electrically connected to the sensing connector through the dummy connector. Therefore, electrostatic charges may be distributed to the dummy pattern. Accordingly, the sensing connector may have a relatively low electrical resistance, and defects on the touch sensing device may be reduced.

Additionally, the dummy pattern of the touch sensing device may be electrically connected to the sensing electrodes which are connected by the sensing connector at two points on the sensing electrodes which are spaced apart from the sensing connector in predetermined distances through the dummy connector. Accordingly, even though the sensing connector is damaged, a signal may bypass through the dummy pattern. Therefore, defects on the touch sensing device may be reduced.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch sensing device comprising:
   a base substrate;
   a first touch electrode comprising:
      first sensing patterns disposed on the base substrate and each comprising a shape that is periodically repeated along a first direction;
      a first dummy pattern disposed on a same layer as the first sensing patterns and disposed between the first sensing patterns, the first dummy pattern comprises a plurality of first sub-dummy patterns spaced apart and insulated from each other; and
      a first dummy connector disposed on the same layer as the first sensing patterns and connecting each first sensing pattern to a portion of the first plurality of sub-dummy patterns;
   a first insulation layer disposed on the first touch electrode; and
   a second touch electrode comprising:
      second sensing patterns disposed on the first insulation layer and each comprising a shape that is periodically repeated along a second direction crossing the first direction:
      a second dummy pattern disposed on a same layer as the second sensing patterns and disposed between the second sensing patterns, the second dummy pattern comprises a plurality of second sub-dummy patterns spaced apart and insulated from each other; and
      a second dummy connector disposed on the same layer as the second sensing patterns and connecting each second sensing pattern to a portion of the second plurality of sub-dummy patterns.

2. The touch sensing device of claim 1,
   wherein each of the first sensing patterns comprises:
      a plurality of first sensing electrodes each having a diamond shape; and
      a first sensing connector connecting at least two of the first sensing electrodes, and
   wherein each of the second sensing patterns comprises:
      a plurality of second sensing electrodes each having a diamond shape; and
      a second sensing connector connecting at least two of the second sensing electrodes.

3. The touch sensing device of claim 2,
   wherein the first dummy connector electrically connects the first sensing connector to a first sub-dummy pattern that is adjacent to the first sensing connector, and
   wherein the second dummy connector electrically connects the second sensing connector to a second sub-dummy pattern that is adjacent to the first sensing connector.

4. The touch sensing device of claim 2,
   wherein the first dummy connectors electrically connects the first dummy pattern to the plurality of first sensing electrodes which are connected by the first sensing connector at two points on the first sensing electrodes which are spaced apart from the first sensing connector by predetermined distances, respectively, and
   wherein the second dummy connector electrically connects the second dummy pattern to the plurality of second sensing electrodes which are connected by the second sensing connector at two points on the second sensing electrodes which are spaced apart from the second sensing connector by predetermined distances, respectively.

5. The touch sensing device of claim 2,
   wherein the first dummy connector electrically connects the first dummy pattern to the plurality of first sensing electrodes, which are connected by the first sensing connector at two points on the first sensing electrodes which are spaced apart from the first sensing connector by predetermined distances, and at one point on the first sensing connector, respectively, and
   wherein the second dummy connector electrically connects the second dummy pattern to the plurality of second sensing electrodes, which are connected by the second sensing connector at two points on the second sensing electrodes which are spaced apart from the second sensing connector in predetermined distances, and at one point on the second sensing connector, respectively.

6. The touch sensing device of claim 1, wherein the first touch electrode and the second touch electrode comprise nanowire.

7. The touch sensing device of claim 1, wherein the first insulation layer is a photosensitive film.

8. The touch sensing device of claim 1, wherein the first insulation layer comprises silicon oxide or silicon nitride.

9. The touch sensing device of claim 8, further comprising a second insulation layer disposed between the base substrate and the first touch electrode.

10. A method of manufacturing a touch sensing device, comprising:
   forming a first touch electrode on a base substrate, the first touch electrode comprising:
      a plurality first sensing patterns comprising a shape that is periodically repeated along a first direction;
      a first dummy pattern disposed on a same layer as the plurality of first sensing patterns and between the plurality of first sensing patterns, the first dummy pattern comprises a plurality of first sub-dummy patterns spaced apart and insulated from each other; and
      a first dummy connector disposed on the same layer as the first sensing patterns and connecting the plurality of first sensing patterns to the first plurality of sub-dummy patterns;

forming a first insulation layer on the first touch electrode; and forming a second touch electrode on the first insulation layer, the second touch electrode comprising:
- a plurality of second sensing patterns comprising a shape that is periodically repeated along a second direction crossing the first direction;
- a second dummy pattern disposed on a same layer as the plurality of second sensing patterns and between the plurality of second sensing patterns, the second dummy pattern comprises a plurality of second sub-dummy patterns spaced apart and insulated from each other; and
- a second dummy connector disposed on the same layer as the second sensing patterns and connecting the plurality of second sensing patterns to the second plurality of sub-dummy patterns.

11. The method of claim 10,
wherein the first sensing pattern comprises:
a plurality of first sensing electrodes each having a diamond shape; and
a first sensing connector connecting at least two of the first sensing electrodes, and
wherein each of the second sensing patterns comprises:
a plurality of second sensing electrodes each having a diamond shape; and
a second sensing connector connecting at least two of the second sensing electrodes.

12. The method of claim 11,
wherein the first dummy connector electrically connects the first sensing connector to a first sub-dummy pattern that is adjacent to the first sensing connector, and
wherein the second dummy connector electrically connects the second sensing connector to a second sub-dummy pattern that is adjacent to the first sensing connector.

13. The method of claim 11,
wherein forming the first touch electrode comprises forming the first dummy connector to electrically connect the first dummy pattern to the plurality of first sensing electrodes which are connected by the first sensing connector at two points on the first sensing electrodes which are spaced apart from the first sensing connector by predetermined distances, respectively, and
wherein forming the second touch electrode comprises forming the second dummy connector to electrically connect the second dummy pattern to the second sensing electrodes which are connected by the second sensing connector at two points on the second sensing electrodes which are spaced apart from the second sensing connector by predetermined distances, respectively.

14. The method of claim 11,
wherein forming the first touch electrode comprises forming the first dummy connector to electrically connect the first dummy pattern to the plurality of first sensing electrodes, which are connected by the first sensing connector at two points on the first sensing electrodes which are spaced apart from the first sensing connector in predetermined distances, and at one point on the first sensing connector, respectively, and
wherein forming the second touch electrode comprises forming the second dummy connector to electrically connect the second dummy pattern to the plurality of second sensing electrodes, which are connected by the second sensing connector at two points on the second sensing electrodes which are spaced apart from the second sensing connector in predetermined distances, and at one point on the second sensing connector, respectively.

15. The method of claim 10, wherein the first touch electrode and the second touch electrode comprise nanowire.

16. The method of claim 10, wherein the first insulation layer is a photosensitive film.

17. The method of claim 10, wherein the first insulation layer comprises silicon oxide or silicon nitride.

18. The method of claim 17, further comprising forming a second insulation layer between the base substrate and the first touch electrode.

* * * * *